(12) United States Patent
Purpus

(10) Patent No.: US 9,384,511 B1
(45) Date of Patent: Jul. 5, 2016

(54) VERSION CONTROL FOR RESOURCE ALLOCATION MODELING

(71) Applicant: Apptio, Inc., Bellevue, WA (US)

(72) Inventor: Eric Scott Purpus, Seattle, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 14/971,944

(22) Filed: Dec. 16, 2015

(51) Int. Cl.
 *G06F 17/30* (2006.01)
 *G06Q 40/00* (2012.01)
 *G06Q 10/06* (2012.01)

(52) U.S. Cl.
 CPC .......... *G06Q 40/12* (2013.12); *G06F 17/30309* (2013.01); *G06F 17/30368* (2013.01); *G06F 17/30495* (2013.01); *G06Q 10/067* (2013.01)

(58) Field of Classification Search
 CPC . G06Q 40/00; G06Q 40/12; G06Q 10/06313; G06Q 10/067; G06F 17/30289; G06F 17/30292; Y10S 707/944; Y10S 707/95
 See application file for complete search history.

(56) References Cited

U.S. PATENT DOCUMENTS

| | | | |
|---|---|---|---|
| 4,744,026 A | 5/1988 | Vanderbei | |
| 5,249,120 A | 9/1993 | Foley | |
| 5,615,121 A | 3/1997 | Babayev et al. | |
| 5,721,919 A | 2/1998 | Morel et al. | |
| 5,758,327 A | 5/1998 | Gardner et al. | |
| 5,799,286 A | 8/1998 | Morgan et al. | |
| 5,802,508 A | 9/1998 | Morgenstern | |
| 5,970,476 A | 10/1999 | Fahey | |
| 5,991,741 A | 11/1999 | Speakman et al. | |
| 6,014,640 A | 1/2000 | Bent | |
| 6,032,123 A | 2/2000 | Jameson | |
| 6,047,290 A | 4/2000 | Kennedy et al. | |
| 6,208,993 B1 | 3/2001 | Shadmon | |
| 6,249,769 B1 | 6/2001 | Ruffin et al. | |
| 6,253,192 B1 | 6/2001 | Corlett et al. | |
| 6,308,166 B1 | 10/2001 | Breuker et al. | |
| 6,321,207 B1 | 11/2001 | Ye | |
| 6,330,552 B1 | 12/2001 | Farrar et al. | |
| 6,424,969 B1 | 7/2002 | Gruenwald | |

(Continued)

FOREIGN PATENT DOCUMENTS

JP  2011134263 A  7/2011

OTHER PUBLICATIONS

Stephen Muller and Hasso Platner, "An IN-Depth Analysis of Data Aggregation Cost Factors in a Columnar In-Memory Database", ACM DOLAP'12, Nov. 2, 2012, Maui, Hawaii, USA, pp. 65-72.*

(Continued)

*Primary Examiner* — Cheryl Lewis
(74) *Attorney, Agent, or Firm* — John W. Branch; Lowe Graham Jones PLLC

(57) ABSTRACT

Embodiments are directed towards managing data models using version control for resource allocation modelling. A main data model that includes change records, resource values, model objects, or the like, may be provided. Also, user workspaces associated with the main data model may be provided. The user workspaces may include a workspace data model that is based on the main data model and its change records. Model objects that may be part of the user workspace may be modified by a user where each modification made by the user may be employed to provide workspace change records. If a user finishes modifying the workspace data model, the one or more workspace change records may be used to execute the merge of the modified model objects with the main data model.

30 Claims, 11 Drawing Sheets

(56) References Cited

U.S. PATENT DOCUMENTS

| | | | |
|---|---|---|---|
| 6,507,825 B2 | 1/2003 | Suh | |
| 6,578,005 B1 | 6/2003 | Lesaint et al. | |
| 6,738,736 B1 | 5/2004 | Bond | |
| 6,789,252 B1 | 9/2004 | Burke et al. | |
| 6,832,212 B1 | 12/2004 | Zenner et al. | |
| 6,839,719 B2 | 1/2005 | Wallace | |
| 6,877,034 B1 | 4/2005 | Machin et al. | |
| 6,882,630 B1 | 4/2005 | Seaman | |
| 6,983,321 B2 | 1/2006 | Trinon et al. | |
| 7,050,997 B1 | 5/2006 | Wood, Jr. | |
| 7,130,822 B1 | 10/2006 | Their et al. | |
| 7,149,700 B1 | 12/2006 | Munoz et al. | |
| 7,177,850 B2 | 2/2007 | Argenton et al. | |
| 7,263,527 B1 | 8/2007 | Malcolm | |
| 7,308,427 B1 | 12/2007 | Hood | |
| 7,321,869 B1 | 1/2008 | Phibbs, Jr. | |
| 7,590,937 B2 | 9/2009 | Jacobus et al. | |
| 7,634,431 B2 | 12/2009 | Stratton | |
| 7,725,343 B2 | 5/2010 | Johanson et al. | |
| 7,742,961 B2 | 6/2010 | Aaron et al. | |
| 7,752,077 B2 | 7/2010 | Holden et al. | |
| 7,761,548 B2 * | 7/2010 | Snyder | G06Q 10/06 702/182 |
| 7,774,458 B2 | 8/2010 | Trinon et al. | |
| 7,783,759 B2 | 8/2010 | Eilam et al. | |
| 7,813,948 B2 | 10/2010 | Ratzloff | |
| 7,877,742 B2 | 1/2011 | Duale et al. | |
| 7,899,235 B1 | 3/2011 | Williams et al. | |
| 7,930,396 B2 | 4/2011 | Trinon et al. | |
| 7,933,861 B2 | 4/2011 | Zadorozhny | |
| 7,945,489 B2 | 5/2011 | Weiss et al. | |
| 7,966,235 B1 | 6/2011 | Capelli et al. | |
| 7,966,266 B2 * | 6/2011 | Delvat | G06Q 10/06 705/400 |
| 8,010,584 B1 | 8/2011 | Craver et al. | |
| 8,024,241 B2 | 9/2011 | Bailey et al. | |
| 8,121,959 B2 * | 2/2012 | Delvat | G06Q 10/06 705/400 |
| 8,175,863 B1 | 5/2012 | Ostermeyer et al. | |
| 8,195,785 B2 * | 6/2012 | Snyder | G06Q 10/06 702/182 |
| 8,200,518 B2 | 6/2012 | Bailey et al. | |
| 8,209,218 B1 | 6/2012 | Basu et al. | |
| 8,214,829 B2 * | 7/2012 | Neogi | G06F 1/3203 713/300 |
| 8,260,959 B2 | 9/2012 | Rudkin et al. | |
| 8,370,243 B1 | 2/2013 | Cernyar | |
| 8,423,428 B2 | 4/2013 | Grendel et al. | |
| 8,484,355 B1 | 7/2013 | Lochhead et al. | |
| 8,601,263 B1 | 12/2013 | Shankar et al. | |
| 8,606,827 B2 * | 12/2013 | Williamson | G06F 17/30539 707/804 |
| 8,766,981 B2 * | 7/2014 | McLachlan | G06Q 10/06313 345/440 |
| 8,768,976 B2 | 7/2014 | McLachlan et al. | |
| 2002/0002557 A1 | 1/2002 | Straube et al. | |
| 2002/0016752 A1 | 2/2002 | Suh | |
| 2002/0056004 A1 | 5/2002 | Smith | |
| 2002/0069102 A1 | 6/2002 | Vellante et al. | |
| 2002/0107914 A1 | 8/2002 | Charisius et al. | |
| 2002/0123945 A1 * | 9/2002 | Booth | G06Q 10/06 705/30 |
| 2002/0145040 A1 | 10/2002 | Grabski | |
| 2002/0156710 A1 | 10/2002 | Ryder | |
| 2002/0178198 A1 | 11/2002 | Steele | |
| 2002/0194329 A1 | 12/2002 | Alling | |
| 2003/0074269 A1 | 4/2003 | Viswanath | |
| 2003/0083888 A1 | 5/2003 | Argenton et al. | |
| 2003/0083912 A1 | 5/2003 | Covington et al. | |
| 2003/0139960 A1 | 7/2003 | Nishikawa et al. | |
| 2003/0139986 A1 | 7/2003 | Roberts, Jr. | |
| 2003/0158724 A1 | 8/2003 | Uchida | |
| 2003/0158766 A1 | 8/2003 | Mital et al. | |
| 2003/0172368 A1 | 9/2003 | Alumbaugh et al. | |
| 2003/0195780 A1 | 10/2003 | Arora et al. | |
| 2003/0217033 A1 | 11/2003 | Sandler et al. | |
| 2003/0236721 A1 | 12/2003 | Plumer et al. | |
| 2004/0059611 A1 | 3/2004 | Kananghinis et al. | |
| 2004/0093344 A1 | 5/2004 | Berger et al. | |
| 2004/0111509 A1 | 6/2004 | Eilam et al. | |
| 2004/0186762 A1 | 9/2004 | Beaven et al. | |
| 2004/0243438 A1 | 12/2004 | Mintz | |
| 2005/0004856 A1 | 1/2005 | Brose et al. | |
| 2005/0060298 A1 | 3/2005 | Agapi et al. | |
| 2005/0060317 A1 | 3/2005 | Lott et al. | |
| 2005/0071285 A1 | 3/2005 | Laicher et al. | |
| 2005/0091102 A1 | 4/2005 | Retsina | |
| 2005/0120032 A1 | 6/2005 | Liebich et al. | |
| 2005/0131929 A1 | 6/2005 | Bailey | |
| 2005/0171918 A1 | 8/2005 | Eden et al. | |
| 2006/0041458 A1 | 2/2006 | Ringrose et al. | |
| 2006/0080264 A1 | 4/2006 | Zhang et al. | |
| 2006/0085302 A1 | 4/2006 | Weiss et al. | |
| 2006/0085465 A1 | 4/2006 | Nori et al. | |
| 2006/0106658 A1 | 5/2006 | Johanson et al. | |
| 2006/0126552 A1 | 6/2006 | Lee et al. | |
| 2006/0161879 A1 | 7/2006 | Lubrecht et al. | |
| 2006/0167703 A1 | 7/2006 | Yakov | |
| 2006/0178960 A1 | 8/2006 | Lepman | |
| 2006/0179012 A1 | 8/2006 | Jacobs | |
| 2006/0190497 A1 | 8/2006 | Inturi et al. | |
| 2006/0200400 A1 | 9/2006 | Hunter et al. | |
| 2006/0200477 A1 | 9/2006 | Barrenechea | |
| 2006/0212334 A1 | 9/2006 | Jackson | |
| 2006/0224740 A1 | 10/2006 | Sievers-Tostes | |
| 2006/0224946 A1 | 10/2006 | Barrett et al. | |
| 2006/0228654 A1 | 10/2006 | Sanjar et al. | |
| 2006/0282429 A1 | 12/2006 | Hernandez-Sherrington et al. | |
| 2007/0088641 A1 | 4/2007 | Aaron et al. | |
| 2007/0113289 A1 | 5/2007 | Blumenau | |
| 2007/0124162 A1 | 5/2007 | Mekyska | |
| 2007/0198982 A1 | 8/2007 | Bolan et al. | |
| 2007/0214413 A1 | 9/2007 | Boeckenhauer | |
| 2007/0226090 A1 | 9/2007 | Stratton | |
| 2007/0260532 A1 | 11/2007 | Blake, III | |
| 2007/0271203 A1 | 11/2007 | Delvat | |
| 2007/0276755 A1 | 11/2007 | Rapp | |
| 2007/0282626 A1 | 12/2007 | Zhang et al. | |
| 2008/0033774 A1 | 2/2008 | Kimbrel et al. | |
| 2008/0065435 A1 | 3/2008 | Ratzloff | |
| 2008/0071844 A1 | 3/2008 | Gopal et al. | |
| 2008/0201269 A1 | 8/2008 | Hollins et al. | |
| 2008/0208647 A1 | 8/2008 | Hawley et al. | |
| 2008/0295096 A1 | 11/2008 | Beaty et al. | |
| 2008/0312979 A1 | 12/2008 | Lee et al. | |
| 2009/0012986 A1 | 1/2009 | Arazi et al. | |
| 2009/0018880 A1 | 1/2009 | Bailey et al. | |
| 2009/0100017 A1 | 4/2009 | Graves et al. | |
| 2009/0100406 A1 | 4/2009 | Greenfield et al. | |
| 2009/0144120 A1 | 6/2009 | Ramachandran | |
| 2009/0150396 A1 | 6/2009 | Elisha et al. | |
| 2009/0198535 A1 | 8/2009 | Brown et al. | |
| 2009/0210275 A1 * | 8/2009 | Andreev | G06Q 10/087 705/400 |
| 2009/0216580 A1 | 8/2009 | Bailey et al. | |
| 2009/0234892 A1 | 9/2009 | Anglin et al. | |
| 2009/0300173 A1 | 12/2009 | Bakman et al. | |
| 2009/0319316 A1 | 12/2009 | Westerfeld et al. | |
| 2010/0005014 A1 | 1/2010 | Castle et al. | |
| 2010/0005173 A1 | 1/2010 | Baskaran et al. | |
| 2010/0042455 A1 | 2/2010 | Liu et al. | |
| 2010/0049494 A1 | 2/2010 | Radibratovic et al. | |
| 2010/0082380 A1 | 4/2010 | Merrifield, Jr. et al. | |
| 2010/0094740 A1 | 4/2010 | Richter | |
| 2010/0125473 A1 | 5/2010 | Tung et al. | |
| 2010/0169477 A1 | 7/2010 | Stienhans et al. | |
| 2010/0185557 A1 | 7/2010 | Hunter et al. | |
| 2010/0211667 A1 | 8/2010 | O'Connell, Jr. | |
| 2010/0250419 A1 | 9/2010 | Ariff et al. | |
| 2010/0250421 A1 | 9/2010 | Ariff et al. | |
| 2010/0250642 A1 | 9/2010 | Yellin et al. | |
| 2010/0293163 A1 | 11/2010 | McLachlan et al. | |
| 2010/0299233 A1 | 11/2010 | Licardi et al. | |
| 2010/0306382 A1 | 12/2010 | Cardosa et al. | |

(56) References Cited

U.S. PATENT DOCUMENTS

| | | | |
|---|---|---|---|
| 2010/0325606 | A1 | 12/2010 | Sundararajan et al. |
| 2010/0332262 | A1 | 12/2010 | Horvitz et al. |
| 2010/0333109 | A1 | 12/2010 | Milnor |
| 2011/0016214 | A1 | 1/2011 | Jackson |
| 2011/0016448 | A1 | 1/2011 | Bauder et al. |
| 2011/0022861 | A1 | 1/2011 | Agneeswaran et al. |
| 2011/0066628 | A1 | 3/2011 | Jayaraman |
| 2011/0072340 | A1 | 3/2011 | Miller |
| 2011/0106691 | A1 | 5/2011 | Clark et al. |
| 2011/0167034 | A1 | 7/2011 | Knight et al. |
| 2011/0225277 | A1 | 9/2011 | Freimuth et al. |
| 2012/0023170 | A1 | 1/2012 | Matignon et al. |
| 2012/0066020 | A1 | 3/2012 | Moon et al. |
| 2012/0131591 | A1 | 5/2012 | Moorthi et al. |
| 2012/0150736 | A1 | 6/2012 | Dickerson et al. |
| 2012/0185368 | A1 | 7/2012 | Schloter et al. |
| 2012/0232947 | A1* | 9/2012 | McLachlan ............ G06Q 10/06 705/7.23 |
| 2012/0233217 | A1 | 9/2012 | Purpus et al. |
| 2012/0233547 | A1 | 9/2012 | McLachlan |
| 2012/0239739 | A1 | 9/2012 | Manglik et al. |
| 2012/0330869 | A1 | 12/2012 | Durham |
| 2013/0041819 | A1 | 2/2013 | Khasho |
| 2013/0060595 | A1 | 3/2013 | Bailey |
| 2013/0103654 | A1 | 4/2013 | McLachlan et al. |
| 2013/0138470 | A1 | 5/2013 | Goyal et al. |
| 2013/0179371 | A1 | 7/2013 | Jain et al. |
| 2013/0201193 | A1 | 8/2013 | McLachlan et al. |
| 2013/0227584 | A1 | 8/2013 | Greene et al. |
| 2013/0282537 | A1 | 10/2013 | Snider |
| 2013/0346390 | A1 | 12/2013 | Jerzak et al. |
| 2014/0067632 | A1 | 3/2014 | Curtis |
| 2014/0075004 | A1 | 3/2014 | Van Dusen et al. |
| 2014/0089509 | A1 | 3/2014 | Akolkar et al. |
| 2014/0279201 | A1 | 9/2014 | Iyoob et al. |
| 2015/0227991 | A1* | 8/2015 | Yu ........................ G06Q 10/067 705/348 |

OTHER PUBLICATIONS

"Activity Based Costing is the best allocation methodology," APPTIO, Community for Technology Business Management, Mar. 16, 2010, 2 pages.
"Amazon Elastic Computer Cloud (Amazon EC2)", archive.org, Oct. 21, 2011, 9 pages http://web.archive.org/web/20111029130914/http://aws.amazon.com/ec2/#pricing.
"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#, Ukm4r8X7Lco.
"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#, Ukm5XsX7Lco.
"Automating Cost Transparency," Apptio, 2008, 15 pages htto://www.cio.com/documents/whitepapers/AutomatedCostTransparency.pdf.
"Cloud Computing and Sustainability: The Environmental Benefits of Moving to the Cloud," Accenture, archive.org Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.
"IT Cost Transparence and Apptio," Dec. 4, 2008, 2 pages http://web.archive.org/web/20081204012515 8/http://www.apptio.com/solutions.
"Notice from the European Patent Office dated Oct. 1, 2007 concerning business methods," Official Journal EPO, Nov. 2007, pp. 592-593.
"Program Evaluation and Review Technique," Wikipedia, the free encyclopedia, accessed Mar. 13, 2012, 10 pages http://en.wikipedia.org/wiki/Program_Evaluation_and_Review_Technique_last modified Mar. 12, 2012,
"Project Management," Wikipedia, the free encyclopedia, accessed Mar. 13, 2012, 14 pages http://en.wikipedia.org/wiki/Project_management_last modified Mar. 7, 2012.
"Visualization for Production Management: Treemap and Fisheye Table Browser," Open-Video Organization webpates, 2001, 2 pages http://www.open-video.org/details.php?videoid=4547.
Busch, J., "Six Strategies for IT Cost Allocation," Spend Matters, Jan. 5, 2011, 3 pages http://spendmatters.com/2011/01/05/six-strategies-for-it-cost-allocation/.
Morgan, T. P., "Apptio puffs up freebie cost control freak for public clouds," The Register, Dec. 12, 2012, 2 pages http://www.theregister.co.uk/2012/12/12/apptio_cloud_express.
Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.
Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.
Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.
International Search Report and Written Opinion for International Patent Application No. PCT/US2010/035021 mailed Jul. 14, 2010, 12 pages.
International Preliminary Report on Patentability for International Patent Application No. PCT/US2010/035021 mailed Nov. 24, 2011, 10 pages.
International Search Report and Written Opinion for International Patent Application No. PCT/US2012/028353 mailed Oct. 31, 2012, 9 pages.
International Preliminary Report on Patentability for International Patent Application No. PCT/US2012/028353 mailed Sep. 19, 2013, 6 pages.
International Search Report and Written Opinion for International Patent Application No. PCT/US2012/028378 mailed on Sep. 12, 2012, 11 pages.
International Preliminary Report on Patentability for International Patent Application No. PCT/US2012/028378 mailed Sep. 19, 2013, 7 pages.
Extended European Search Report in EP Application No. 13151967.0-1955, mailed Apr. 19, 2013, 8 pages.
Official Communication for U.S. Appl. No. 12/467,120 mailed Oct. 4, 2011, 12 pages.
Official Communication for U.S. Appl. No. 12/467,120 mailed Jun. 20, 2012, 17 pages.
Official Communication for U.S. Appl. No. 12/467,120 mailed Aug. 29, 2012, 3 pages.
Official Communication for U.S. Appl. No. 12/467,120 mailed Oct. 23, 2013, 21 pages.
Official Communication for U.S. Appl. No. 12/467,120 mailed Mar. 26, 2013, 18 pages.
Official Communication for U.S. Appl. No. 13/324,253 mailed Sep. 25, 2012, 17 pages.
Official Communication for U.S. Appl. No. 13/324,253 mailed Jan. 10, 2013, 20 pages.
Official Communication for U.S. Appl. No. 13/324,253 mailed Mar. 19, 2013, 3 pages.
Official Communication for U.S. Appl. No. 13/324,253 mailed Sep. 5, 2013, 21 pages.
Official Communication for U.S. Appl. No. 13/415,797 mailed Oct. 3, 2013, 17 pages.
Official Communication for U.S. Appl. No. 13/452,628 mailed Apr. 22, 2013, 11 pages.
Official Communication for U.S. Appl. No. 13/675,837 mailed Oct. 10, 2013, 41 pages.
Official Communication for U.S. Appl. No. 13/837,815 mailed Oct. 23, 2013, 9 pages.
Official Communication for U.S. Appl. No. 13/917,478 mailed Nov. 7, 2013, 15 pages.

(56) References Cited

OTHER PUBLICATIONS

Official Communication for U.S. Appl. No. 13/917,503 mailed Oct. 10, 2013, 41 pages.
Official Communication for U.S. Appl. No. 13/935,147 mailed Oct. 22, 2013, 16 pages.
Official Communication for U.S. Appl. No. 13/649,010 mailed Sep. 23, 2015, 15 pages.
Official Communication for U.S. Appl. No. 13/365,150 mailed Sep. 24, 2015, 15 pages.
Official Communication for U.S. Appl. No. 14/033,130 mailed Sep. 15, 2015, 22 pages.
Official Communication for U.S. Appl. No. 13/452,628 mailed Jan. 12, 2016, 21 pages.
Official Communication for U.S. Appl. No. 13/649,019 mailed Jan. 4, 2016, 8 pages.
European Examination Report for Application No. 14159413.5 mailed Jul. 15, 2015, 9 pages.
Office Communication for U.S. Appl. No. 13/415,701 mailed on Oct. 27, 2015, 16 pages.
Office Communication for U.S. Appl. No. 14/869,721 mailed Jan. 13, 2016, 57 pages.
Office Communication for U.S. Appl. No. 13/675,837 mailed on Oct. 26, 2015, 20 pages.
Office Communication for U.S. Appl. No. 13/917,503 mailed on Oct. 22, 2015, 19 pages.
Office Communication for U.S. Appl. No. 14/722,663 mailed on Dec. 1, 2015, 37 pages.
Official Communication for U.S. Appl. No. 13/452,628 mailed Nov. 18, 2013, 15 pages.
Official Communication for U.S. Appl. No. 14/033,130 mailed Dec. 16, 2013, 15 pages.
Official Communication for U.S. Appl. No. 13/324,253 mailed Jan. 23, 2014, 15 pages.
Official Communication for U.S. Appl. No. 13/675,837 mailed Jan. 31, 2014, 37 pages.
Official Communication for U.S. Appl. No. 13/917,503 mailed Jan. 31, 2014, 25 pages.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-cost-on-aws.
Amazon Reserved Instances, Amazon Web Services, archives org, Jan. 14, 2013 http://web.archive.org/web/2012011453849/http://aws.amazon.com/rds/reserved-instance/?.
Cost Optimisation with Amazon Web Services, extracted slides, Slideshare Jan. 30, 2012 http://www.slideshare.net/AmazonWebServices/cost-optimisation-with-amazon-web-services?from_search=1.
Deciding an Approach to the cloud AWS Reserved instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/augot-scaling-using-amazon-web-services-aws.
Office Communication for U.S. Appl. No. 13/415,797 mailed on Apr. 9, 2014, 18 pages.
Office Communication for U.S. Appl. No. 13/324,253 mailed on Apr. 9, 2014, 3 pages.
Office Communication for U.S. Appl. No. 13/324,253 mailed on Oct. 24, 2014, 26 pages.
Office Communication for U.S. Appl. No. 13/365,150 mailed on Dec. 3, 2014, 16 pages.
Office Communication for U.S. Appl. No. 13/452,628 mailed on Oct. 1, 2014, 14 pages.
Office Communication for U.S. Appl. No. 13/837,815 mailed on Apr. 7, 2014, 14 pages.
Office Communication for U.S. Appl. No. 13/365,150 mailed on Dec. 7, 2015, 3 pages.
Office Communication for U.S. Appl. No. 13/675,837 mailed on Apr. 2, 2014, 3 pages.
Office Communication for U.S. Appl. No. 13/917,503 mailed on Apr. 3, 2014, 3 pages.
Office Communication for U.S. Appl. No. 13/935,147 mailed on Apr. 11, 2014, 22 pages.
Office Communication for U.S. Appl. No. 13/935,147 mailed on Jun. 16, 2014, 3 pages.
Office Communication for U.S. Appl. No. 14/033,130 mailed on May 27, 2014, 22 pages.
Office Communication for U.S. Appl. No. 14/033,130 mailed on Aug. 5, 2014, 3 pages.
Office Communication for U.S. Appl. No. 14/180,308 mailed on Jan. 30, 2015, 21 pages.
Office Communication for U.S. Appl. No. 14/180,308 mailed on Apr. 8, 2014, 16 pages.
Office Communication for U.S. Appl. No. 13/452,628 mailed on Mar. 13, 2014, 15 pages.
SAS Activity-Based Management, 2010, Fact Sheet, 4 pages.
Office Communication for U.S. Appl. No. 14/180,308 mailed on Sep. 2, 2014, 19 pages.
Office Communication for U.S. Appl. No. 14/180,308 mailed on Apr. 17, 2015, 5 pages.
Extended European Search Report in EP Application No. 14159413.5 mailed Jul. 4, 2014, 11 pages.
Office Communication for U.S. Appl. No. 13/415,797 mailed on Jan. 12, 2015, 20 pages.
Office Communication for U.S. Appl. No. 13/837,815 mailed Sep. 25, 2014, 16 pages.
Office Communication for U.S. Appl. No. 13/324,253 mailed on Feb. 19, 2015, 22 pages.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
Office Communication for U.S. Appl. No. 13/949,019 mailed on Feb. 10, 2015, 14 pages.
European Search Report for Application No. 12755613.2 mailed on Jan. 26, 2015, 6 pages.
Office Communication for U.S. Appl. No. 13/452,628 mailed on Mar. 30, 2015, 18 pages.
Office Communication for U.S. Appl. No. 13/917,503 mailed on Apr. 16, 2015, 19 pages.
Office Communication for U.S. Appl. No. 13/675,837 mailed on Apr. 16, 2015, 19 pages.
Office Communication for U.S. Appl. No. 13/837,815 mailed on Apr. 27, 2015, 18 pages.
Office Communication for U.S. Appl. No. 13/452,628 mailed on Jun. 23, 2015, 3 pages.
Office Communication for U.S. Appl. No. 13/415,797 mailed Jul. 23, 2015, 22 pages.
International Search Report and Written Opinion for PCT/US2015/015486 mailed Jun. 29, 2015, 13 pages.
Office Communication for U.S. Appl. No. 13/935,147 mailed Jul. 9, 2015, 6 pages.
Official Communication for U.S. Appl. No. 13/415,797 mailed on Oct. 19, 2015, 3 pages.
Official Communication for U.S. Appl. No. 13/837,815 mailed on Sep. 28, 2015, 20 pages.
Chien-Liang Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).

(56) References Cited

OTHER PUBLICATIONS

David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).

Office Communication for U.S. Appl. No. 14/846,349 mailed on Dec. 17, 2015, 23 pages.

International Search Report and Written Opinion for PCT/US2015/048697 mailed Mar. 31, 2016, 9 pages.

Office Communication for U.S. Appl. No. 13/365,150, mailed on Apr. 6, 2016, 11 pages.

Office Communication to U.S. Appl. No. 14/722,663, mailed on Mar. 31, 2016, 5 pages.

Van Diessen et al., "Component Business Model for Digital Repositories: A Framework for Analysis," AAAI, 2008, 7 pages.

Melcher et al., "Visualization and Clustering of Business Process Collections Based on Process Metric Values," IEEE Computer Society, 2008, 4 pages.

Lee et al., "Value-Centric, Model-Driven Business Transformation," IEEE, 2008, 8 pages.

Lee et al., "Business Transformation Workbench: A Practitioner's Tool for Business Transformation," IEEE International Conference on Services Computing, 2008, 8 pages.

Risch et al., "Interactive Information Visualization for Exploratory Intelligence Data Analysis," IEEE Proceedings of VRAIS, 1996, 10 pages.

Office Communication for U.S. Appl. No. 13/415,797, mailed on Apr. 4, 2016, 24 pages.

Office Communication for U.S. Appl. No. 13/837,815, mailed on Apr. 13, 2016, 22 pages.

Office Communication for U.S. Appl. No. 14/867,552, mailed on Apr. 25, 2016, 12 pages.

Office Communication for U.S. Appl. No. 14/033,130, mailed on Apr. 25, 2016, 4 pages.

Official Communication for U.S. Appl. No. 13/935,147 mailed on Mar. 9, 2016, 10 pages.

Official Communication for U.S. Appl. No. 14/033,130 mailed on Feb. 18, 2016, 22 pages.

* cited by examiner

| ID | Timestamp | User | Status | Description |
|---|---|---|---|---|
| 10000 | 10/12/2011 14:12:00 | admin@apptio.com | Success | Edit driver Desktops/Bad Value in Cost: DriverCTO {name='Bogus Cost' notes='as per DS'; } |
| 10001 | 10/12/2011 14:12:45 | admin@apptio.com | Success | SaveCostObjectUnits: ObjectInfo/Desktops/January:2011 |
| 10002 | 10/12/2011 14:12:55 | admin@apptio.com | Undone | SaveCostObjectUnits: ObjectInfo/Laptops/January:2011 |
| 10003 | 10/12/2011 14:13:00 | admin@apptio.com | Undone | SaveCostObjectUnits: ObjectInfo/PDA/January:2011 |
| 10004 | 10/12/2011 14:13:10 | admin@apptio.com | Success | SaveCostObjectUnits: ObjectInfo/Desktops/January:2011 |
| 10005 | 10/12/2011 14:13:48 | admin@apptio.com | Success | SaveCostObjectUnits: ObjectInfo/Desktops/January:2011 |
| 10006 | 10/12/2011 14:14:04 | admin@apptio.com | Success | SaveTableByKey: Data/January:2011/Desktops/rawTable |
| 10007 | 10/12/2011 14:14:05 | admin@apptio.com | Success | MakeTag; tagName='Build 10' |
| 10008 | 10/12/2011 14:14:35 | admin@apptio.com | Success | SaveCostObjectUnits: ObjectInfo/Servers/January:2011 |

*FIG. 6*

VERSION CONTROL FOR RESOURCE ALLOCATION MODELING

TECHNICAL FIELD

The present invention relates generally to computer automated activity based budget modeling, forecasting and cost accounting, and more particularly, but not exclusively to version control for data models and budgets.

BACKGROUND

Businesses that strive to remain viable and successful in today's competitive commercial environment are required to adopt accurate and responsive budgeting practices. To improve efficiency, businesses use financial data models that apply modern budgeting, forecasting and cost accounting techniques. For some accounting techniques, the complexity of the financial models may increase as the number of tracked activities and elements increases. Therefore, for larger enterprises, sophisticated computer programs and computers are often required to assist in generating useful and relevant budgets based on financial models. In some cases, the large number of items and entities required for financial modeling can make development of modeling applications difficult. Historically, the size and complexity of these financial allocation models have made it difficult to accurately ascertain a total cost of ownership for an offering such as a product and/or service. Further, the size and complexity of modern financial allocation models can make it difficult to generate reporting information based on the model. In some cases multiple persons or entities may need to edit or modify a data model at the same time. Accordingly, the integrity of the data model may depend on maintaining model consistency even though multiple persons are editing the data model. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein:

FIG. 6 illustrates a partial view of a change journal for at least one of the various embodiments;

DETAILED DESCRIPTION OF THE VARIOUS EMBODIMENTS

Figure 1:
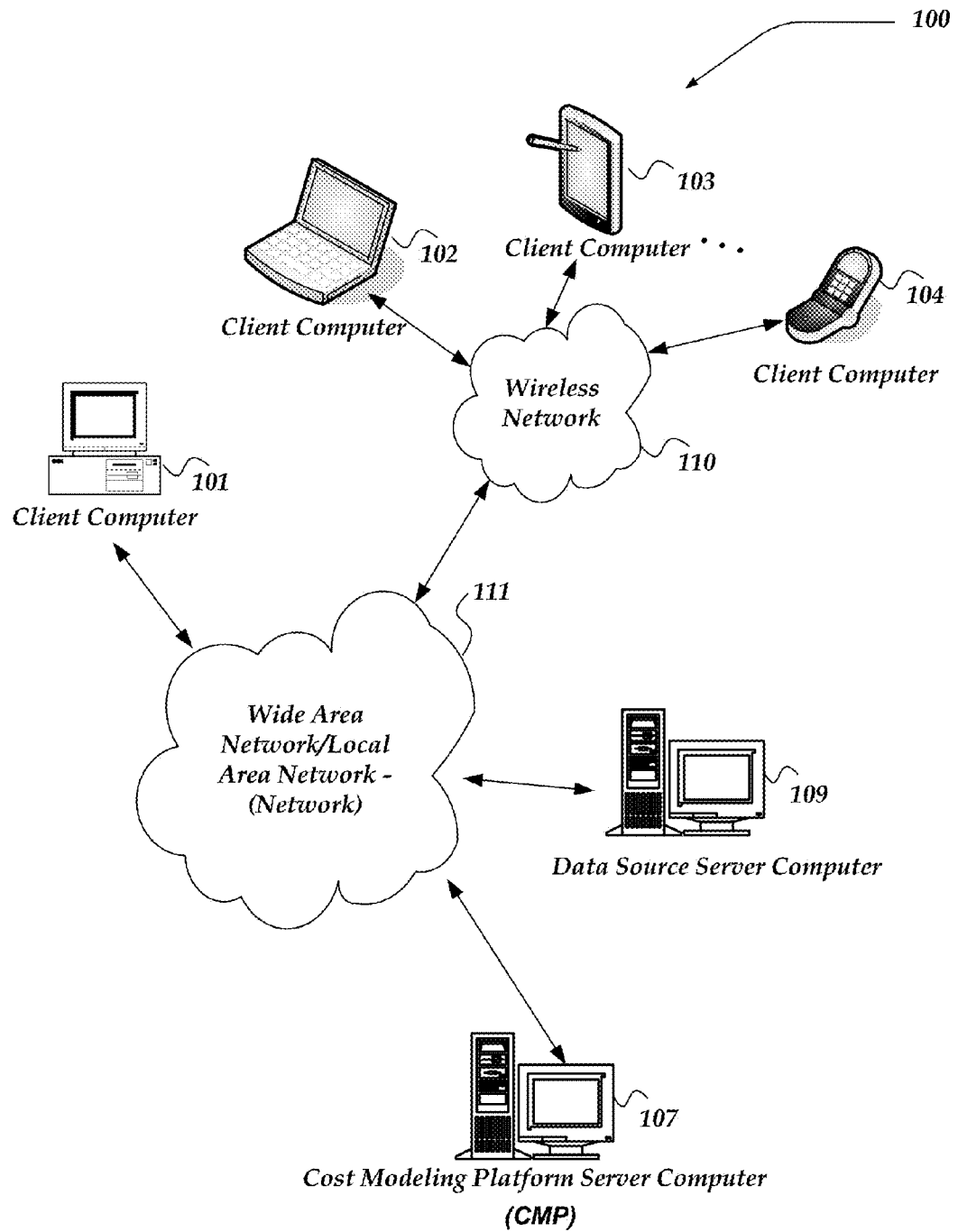
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "Financial allocation model," "data model", and "cost model" refers to a graph based representation of a system of financial allocation rules that can be used for costing actual expenditures (for management accounting) or budgeting future expenditures. Nodes in the model may represent classes of items that may be associated with costs and/or expenses. The edges of the graph may represent how the costs and/or expenses may be allocated between the nodes. A financial allocation model may be a visual rendering of a graph showing the nodes and the edges connecting the nodes.

As used herein, the term "main data model" refers to data model that represents the current version of the data model. Other versions of the data model may be derived from a main data model.

As used herein, the term "workspace data model" refers to a data model associated/included with a user workspace. Workspace data models are created from a main data model. Objects and values in workspace data model are referenced from their main data model, unless they have been changed in the user workspace. If they have been changed, the change is maintained in the context of the user workspace.

As used herein, the term "model line item," refers to a single line item in a data model and its associated characteristics, including resources, costs, expenses, or the like. For example, the costs associated with a particular computer that is an email server may be represent by a single model line item having a particular cost (e.g., the email server may correspond to a model line item).

As used herein, the term "category," or "model object" refers to a set and/or class of model line items that may be grouped together. Also, dataset information may be mapped to one or more categories by an ingestion engine. For example, a collection of computers performing services such as email, web serving, enterprise resource planning, may represent separate model line items and they may be grouped into the Servers category and/or Servers Object.

As used herein, the terms "allocation rules," "entity propagation rules," or "propagation rules" refer to rules in the financial data model that determine how the costs/expenses from a category are apportioned between/among other categories. Also, such rules may be assigned to individual cost line items. For example, if an email server cost line item has a value of $1000 an allocation or entity propagation rule may be defined such that 50% of the expense may be allocated to the Marketing department and 50% may be allocated to the Engineering department. Also, allocation rules may be applied at the category/object as well as the model line item level.

As used herein, the term "assignment ratios," refers to an allocation rule, or the results of applying one or more rules, of the distribution ratio of costs to cost line items or categories. For example, if $1000 may be allocated to Servers category, and the cost line item Email Server is allocated $800 and the cost line item FTP Server is allocation $200, the assignment ratios may be determined to 80% to budget item line Email Server and 20% to cost line item FTP Server. Assignment ratios may be explicitly defined by allocation rules. Or they may be derived from the allocation tables by converting the values into ratios of the total allocation to the category.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. Non-tabular datasets can also take the form of marked up strings of characters, such as an XML file.

As used herein, the term "source object" refers to a model object in a data model that may be providing resource values (e.g., costs/expenses) that may be allocated to one or more other model objects (target objects). In at least one of the various embodiments, source objects may be used to represent one or more categories in a data model.

As used herein, the term "target object" refers to an object in a data model that may be allocated values (e.g., costs/expenses) from one or more other objects (source objects). In at least one of the various embodiments, target objects may be used to represent one or more categories in a data model.

As used herein, the term "model object" refers to items that comprises a given data model. The model objects comprising data models may also be considered categories in financial allocation models, cost models, or the like. Also, in some embodiments, model objects may be considered towers or sub-towers of cost models. One or more model elements in a raw customer model may be mapped to one or more elements of a customer model based on a standard model.

As used herein, the term "change journal," refers to a store of preserved records of the actions and events that may have been taken to generate a data model in accordance with at least one of the various embodiments. In general, a data model may be a combination of an associated change journal and associated resource value data. In at least one of the various embodiments, a data model may be generated from a change journal and appropriate source data. In at least one of the various embodiments, a change journal may be implemented as a log of change journal records.

As used herein, the term "change journal record," "change record," or "journal record" refers to individual records that may be combined and/or collected in a change journal. Each change record may be a record of one or more actions and/or state changes performed to generate a data model. In some embodiment, each change/modification that is made to a data model may correspond to one or more change journal records that are stored in a change journal for the data model.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards managing data models using version control for resource allocation modelling. In at least one of the various embodiments, a main data model that at least includes a plurality of change records, one or more resource values, one or more model objects, or the like, may be provided. In at least one of the various embodiments, the main data model further includes, one or more allocation rules that may allocate one or more resources within the main data model.

In at least one of the various embodiments, one or more user workspaces that may be associated with the main data model may be provided, wherein the one or more user workspaces provide a workspace data model based on the main data model and/or one or more of the plurality of change records.

In at least one of the various embodiments, one or more model objects that may be both included with the one or more user workspaces and modified by a user such that each modification by the user to the modified model objects may be employed to provide one or more workspace change records.

In at least one of the various embodiments, if a user finished modifying the workspace data model, employing the one or more workspace change records to execute the merge of the one or more modified model objects with the main data model. In at least one of the various embodiments, merging the main data model, may include modifying the one or more model objects in the merged main data model; and, in some embodiments, including one or more new change records with the merged data model such that the one or more new change records correspond to the one or more workspace change records.

In at least one of the various embodiments, the workspace data model may be provided by executing the portion of the plurality of change records to perform actions in the user workspace.

In at least one of the various embodiments, the one or more resource values from the workspace data model may referenced from the workspace data model such that the workspace data model references a version of the one or more resource values based on when the user workspace is provided.

In at least one of the various embodiments, one or more workspace resource values may be provided based on modifications made to the one or more model objects. And, in some embodiments, those workspace resource values may be stored separately from the main data model.

In at least one of the various embodiments, the user workspace may be synchronized with the main data model by providing one or more change records from the main data model that may be newer than the change records used to initially generate the workspace data model. And, in some embodiments, the workspace data model may be modified based on the newer change records from the main data model.

In at least one of the various embodiments, caching at least a portion of the one or more resource values in the user workspace if network communication is unavailable. And, in some embodiments, providing the cached at least portion of the one or more resource values if network communication is available.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")–(network) 111, wireless network 110, client computer 101-104, and Cost Modeling Platform Server (CMP) 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network. Today, many of these devices include a capability to access and/or otherwise communicate over a network such as network 111 and/or wireless network 110. Moreover, client computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including budgeting and forecasting information, between another computing device. Client applications may include a capability to provide requests and/or receive data relating to the cost models, budget reports, budget project information, allocation rules, or the like. The client application may provide data representing assignment and/or allocation changes, selecting templates, editing cost allocations between or among categories, generating and/or modifying recursive allocation rules, or the like. In at least one of the various embodiments, client applications may receive and/or generate data related to budgeting and financial models and may generate tables and relationships between and among the data. In at least one of the various embodiments, client computers 101-104 may view and/or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, CMP 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
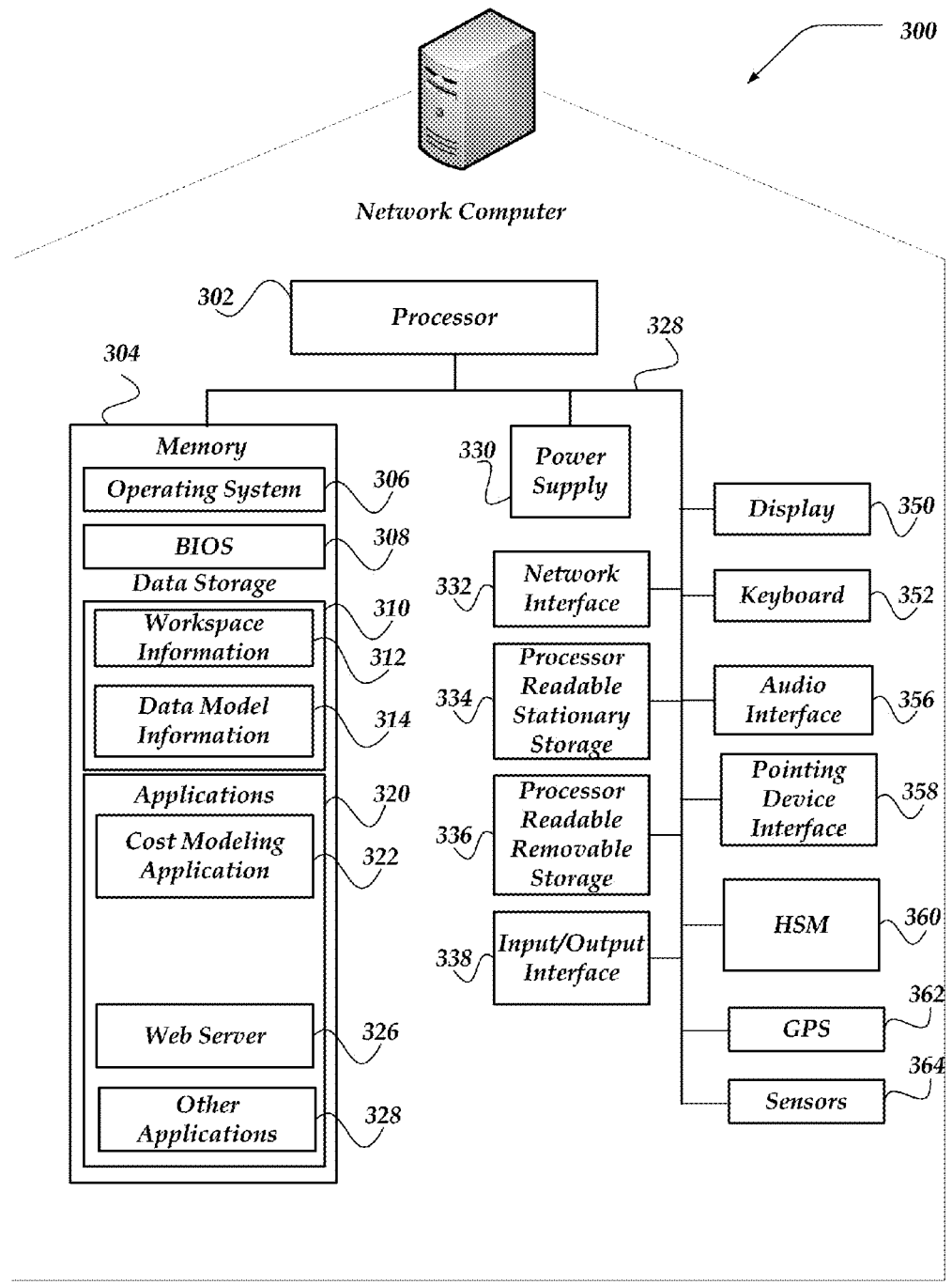
FIG. 3 illustrates one embodiment of a network computer that may be included in a system.

CMP 107 may include virtually any network computer usable to perform data processing operation that may be used for generating cost models, data models, allocation rules, recursive allocation rules, cost allocations, total cost values for offerings, displays and/or reports thereof, such as network computer 300 of FIG. 3. In at least one of the various embodiments, CMP 107 employs various techniques to create, define, generate, and/or automated data processing applications such as budgeting and financial management applications and one or more cost models and/or data models. CMP 107 may include modules for generating data processing applications that may apply models that may include dataset templates, category templates, allocation rules, recursive allocation rules or the like. Furthermore, CMP 107 may include and/or generate data processing applications for visualizing the generated allocation categories, cost allocations, budgets, cost models, data models, allocation rules, recursive allocation rules, total cost values for offerings, or the like.

Devices that may operate as CMP 107 include various network computers, including, but not limited to personal computers, desktop computers, multiprocessor systems, microprocessor-based or programmable consumer electronics, network PCs, server devices, tablet computers, network appliances, or the like. It should be noted that while CMP 107 is illustrated as a single network computer, the invention is not so limited. Thus, in another embodiment, CMP 107 may represent a plurality of network computers. For example, in at least one of the various embodiments, CMP 107 may be distributed over a plurality of network computers and/or implemented using cloud architecture.

Moreover, CMP 107 is not limited to a particular configuration. Rather, CMP 107 may operate using a controller/worker approach over a plurality of network computers, within a cluster, a peer-to-peer architecture, cloud-based architecture (e.g., virtual machines), and/or any of a variety of other architectures. Thus, CMP Server Computer 107 is not to be construed as being limited to a single environment, and other configurations, and architectures are also envisaged. CMP Server Computer 107 may employ processes and such as described below in conjunction with FIG. 4 and above to perform at least some of its actions.

Illustrative Client Computer

Figure 2:
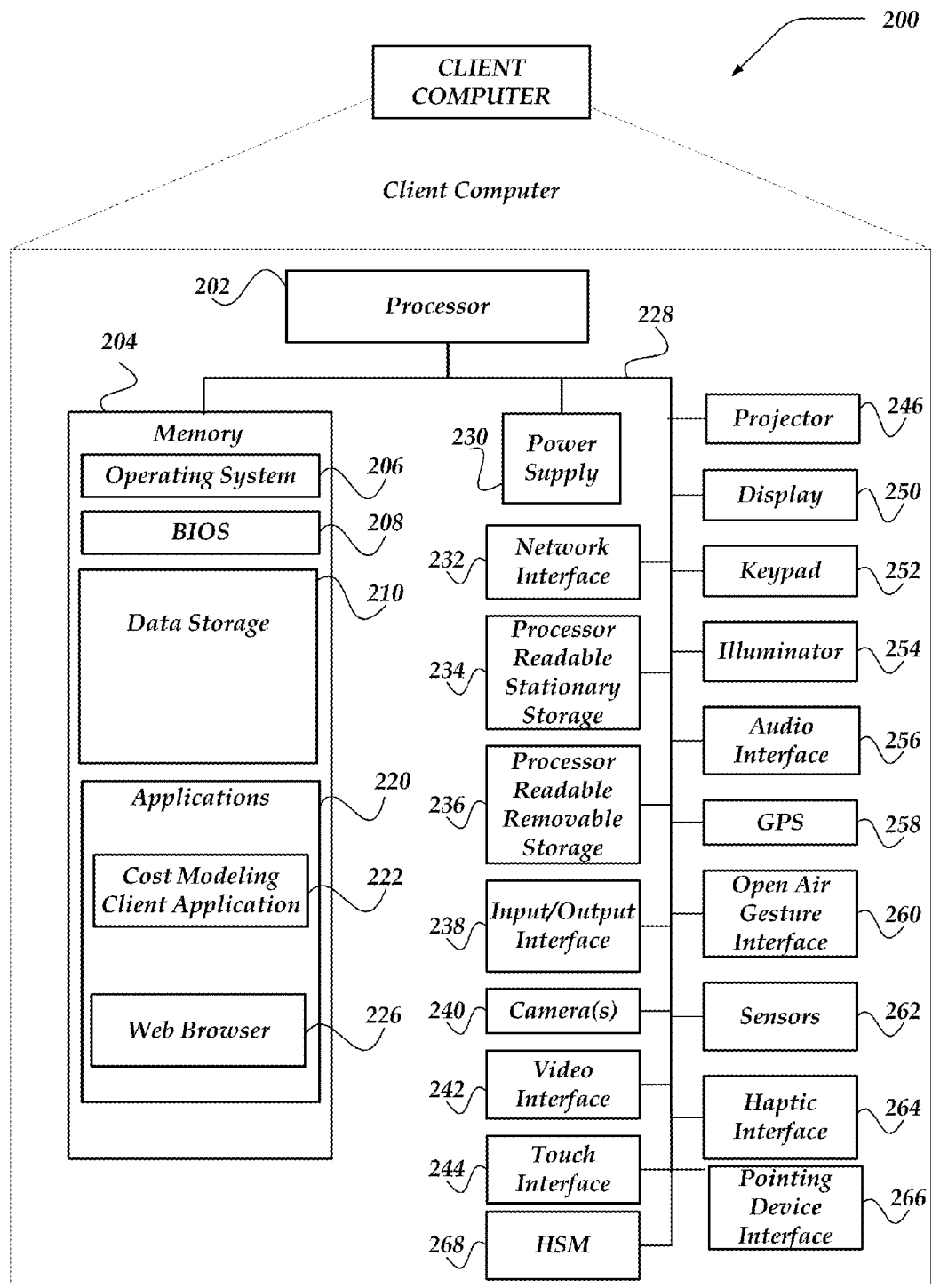
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, cost modeling client application 222. In at least one of the various embodiments, cost modeling client application 222 may be used to exchange communications to and from cost modeling platform server computer 107, including, but not limited to, queries, searches, API calls, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of cost modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, workspace information 312, data model information 314, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include cost modeling application 322, web server application 326, other applications 328, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, cost modeling application 322, web server application 326, other applications 328, or the like, may be arranged to employ geolocation information to select one or more localization features, such as, time zones, languages, currencies, calendar formatting, or the like. Localization features may be used in user-interfaces and well as internal processes and/or databases. In at least one of the various embodiments, geolocation information used for selecting localization information may be provided by GPS 362. Also, in some embodiments, geolocation information may include information providing using one or more geolocation protocol over the networks, such as, wireless network 108 and/or network 111.

Furthermore, in at least one of the various embodiments, cost modeling application 322 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to cost modeling application 322 may be provisioned and de-commissioned automatically.

Also, in at least one of the various embodiments, cost modeling application 322, or the like, may located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

In at least one of the various embodiments, cost modeling application 322 may enable a user to generate budgets, allocation rules, recursive allocation, data model, cost models, total cost values for offerings, reports, or the like. Also in at least one of the various embodiments, modeling application 322 may employ processes, or parts of processes, similar to those described below.

Illustrative Logical System Architecture

Figure 4:
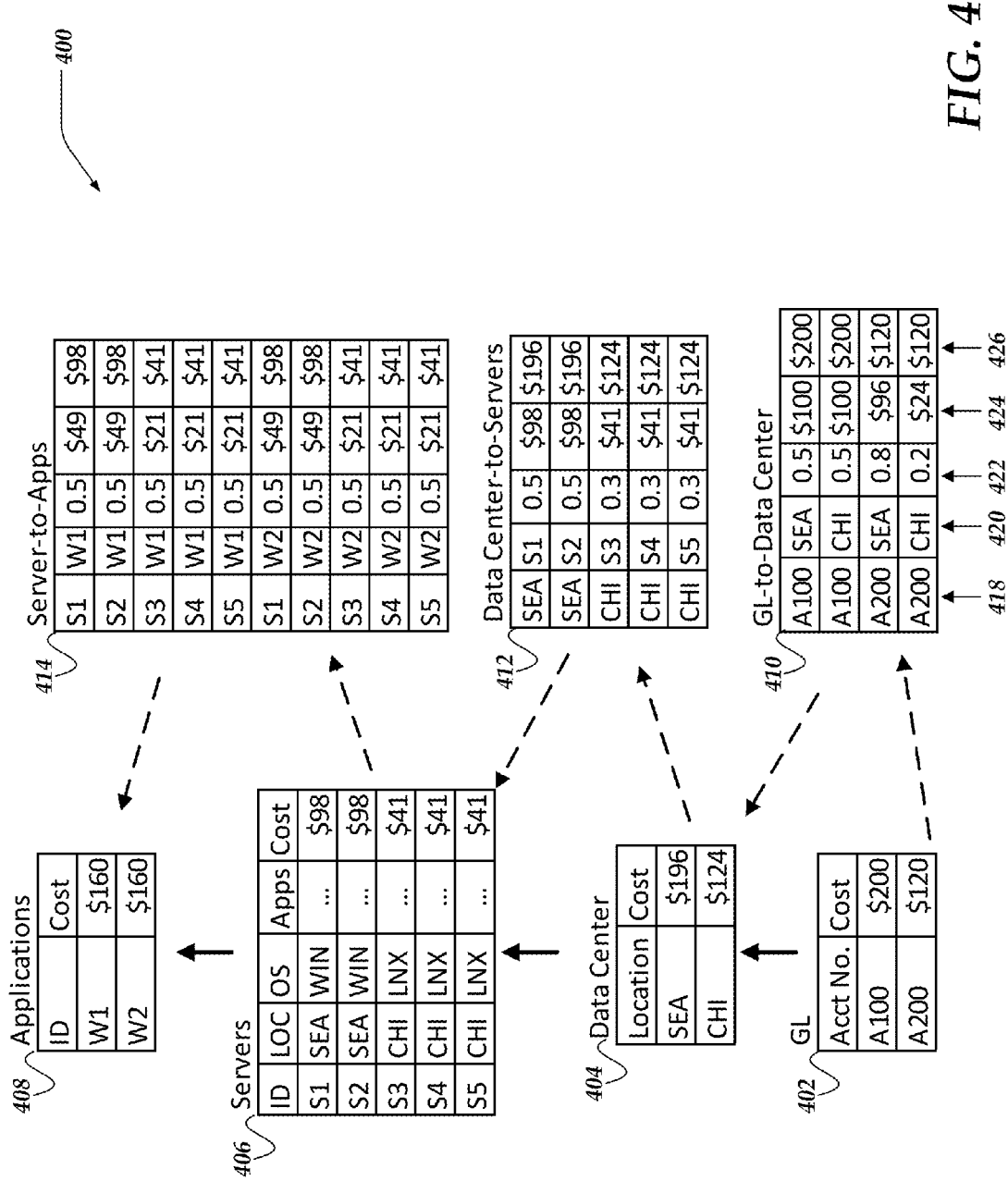
FIG. 4 illustrates a portion of a logical architecture for a data model that illustrates how resources may be allocated in a data model in accordance with at least one of the various embodiments.

FIG. 4 illustrates a portion of a logical architecture for data model 400 that illustrates how resources may be allocated in a data model in accordance with at least one of the various embodiments. Data model 400 is an example of a data model that may be arranged to model how resources, such as, money flow through a system and/or organization. Data model 400 is a simplified example that is used to describe some the concepts of the innovations included herein. One of ordinary skill in the art will appreciate that in practice data models may include hundreds or thousands of model objects each having up millions of model items. For example, data model 400 includes a GL (general ledger) object, GL object 402. In this example, GL object 402 is shown as having two accounts, account A100 and account A200. It will be well-known that in production environments there may be many more accounts in a business's General Ledger. Likewise, servers object 406 is shown as having five servers. However, in production environments, a servers object may represent thousands of servers. Furthermore, model objects used in production environments may have more and/or different columns depending on the configuration of the data model and the dataset used to generate the data model. Nevertheless, while data model 400 is a simplified representation of a data model it is sufficient to enable of one ordinary skill in the art to understand and practice the innovations included herein.

In this example, data model 400 may be arranged to include GL object 402, data center object 404, servers object 406, and applications object 408. The objects in the data model represent how money from GL object 402 may be distributed through a business system. Further, assignment ratio tables, such as, assignment ratio table 410, 412, and 414 may be defined to control how money may be distributed from one model object to another, Assignment ratio tables may be arranged to include allocation rules describing how resources flow from one model object in a data model to another.

In this example, data model 400 includes an assignment ratio table (assignment ratio table 410) to allocate money from GL object 402 to data center object 404. Also, in this example, data model 400 includes an assignment ratio table (assignment ratio table 412) to allocate money from data center object 404 to servers object 406. And, in this example, data model 400 includes an assignment ratio table (assignment ratio table 414) to allocate money from servers object 406 to applications object 406.

In at least one of the various embodiments, the details of how costs may be allocated from one object in the model to another may be encapsulated in one or more allocation rules. In at least one of the various embodiments, allocation rules may generate one or more assignment ratio tables that describe how cost values flow between the modeled objects. For data model 400, allocation rules may be described and illustrated in the form of assignment ratio tables 410, 412, and 414. In some embodiments, the allocation rules may define how an assignment ratio table may be arranged.

In at least one of the various embodiments, an assignment ratio table may be arranged to include one or more columns of information, such as, source object line item 418, target object line item 420, assignment ratio 422, allocation value 424, source value 426, or the like. In this example, the entries in the source object line item column 418 correspond to the line items in GL object 402. Namely, A100 and A200 (e.g., representing account names from a chart-of-accounts). Also, the entries in target object line item column 420 correspond to the line items comprising data center object 404 (e.g., SEA for Seattle and CHI for Chicago). The next column, assignment ratio column 422, contains a value for computing how much money flows from the source object line item to the target object line item. In this example, an allocation rule corresponding to assignment ratio table 410 causes the money from A100 to be evenly divided between location SEA and location CHI. Likewise, 80% (0.8) of the money from A200 is allocated to location SEA and 20% (0.2) is allocated to location CHI. Column 424 in assignment ratio table 410 shows the amount of money that flows from the source object line item to the target item. And column 426 shows the amount of money that the source object line item starts with. For example, based on GL object 402, A100 starts with $200 and A200 starts with $120. Thus, since the assignment ratio for A200 is 80% to location SEA, the line item for SEA is allocated $96 (approximately 80% of $120) while location CHI is allocated $24 (approximately 20% or $120). Likewise, since, in this example, A100 is evenly split with allocation ratio 50% or 0.5 between location SEA and location CHI, each location is allocated $100. In at least one of the various embodiments, the values in data center object 404 reflect the application of the allocation rules corresponding to assignment ratio table 410. Similarly, the remaining objects in model 400 may be allocated costs based on their respective allocation rules and corresponding assignment ratio tables.

In at least one of the various embodiments, the underlying reason for employing a particular allocation rule may depend on the objects that are being modeled. For example, in model 400, account A100 is modeled as a line item in GL object 402 and it may represent the costs/money allocated to operating a Seattle based data center. And A200, also modeled as a line item in GL object 402, may represent the costs/money allocated to operating a Chicago based data center.

Likewise, in this example, referring to assignment ratio table 412, money is allocated from to the servers items. In this example, money allocated to the Seattle data center (SEA in data center object 404) is split between two servers, S1 and S2, while money allocated to the Chicago (CHI) data center is split between three servers (e.g., S3, S4, S5).

Finally, data model 400 models how money is allocated from servers object 406 to applications represented by application object 408. In this case, assignment ratio table 414 shows that the costs allocated to each server are evenly allocated to application W1 and application W2. For examples, the first line of assignment ratio table 414 shows that half of the costs of server S1 ($49) are allocated to application W1 with the other half of the costs of server S1 ($49) are allocated to application W2. Similarly, the costs associated with the other servers (S2-S5) are split between application W1 and W2.

Accordingly, in at least one of the various embodiments, data models, such as, data model 400 enable reports to be generated that answer various questions about how resources are allocated throughout the modeled business system. For example, data model 400 shows that the $320 that entered the system through GL object 402 is split evenly between applications W1 and W2.

Likewise, data model 400 easily answers questions, such as, how much money is allocated to each server located in Seattle? The answer of $98 for each server is readily derived from servers object 406. Generally, models such as data model may enable detailed reporting on how money (or other resources) flow between object that are adjacent in the data models. Reports such as tracing the costs from one object to another may be efficiently generated as long as there are no intervening objects in the model.

One of ordinary skill in the art will appreciate that model objects and tables such as those described above may be arranged to have more or fewer features, columns, rows, or the like. Likewise, data models may be arranged in different geometries and have more (many more) or fewer model objects depending on the application and/or the business system being modeled. Also, data models may be arranged to model the allocation of different resources, such as, financial resources (money), energy, water, power, or the like, among different parts of an enterprise or organization.

In at least one of the various embodiments, line items for the various data model objects may be generated based on actual datasets for the business/system that may be represented by a data model. In this example, GL object 402 has line items that correspond to accounts in a business's GL ledger. Data center object 404 includes line items that represent each data center; servers object 406 includes line items that represent each server computer in the organization.

Figure 5:
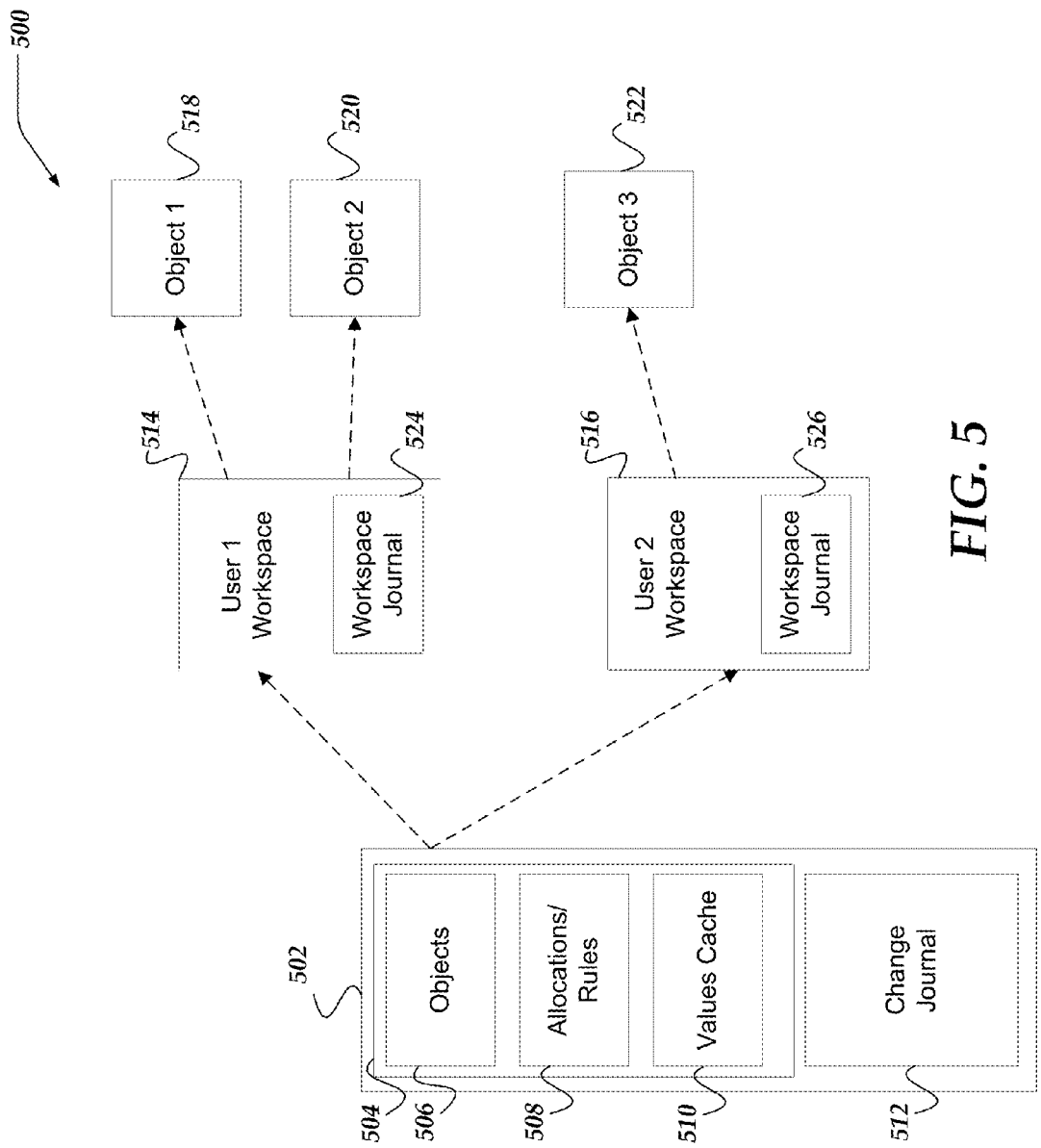
FIG. 5 illustrates a logical representation of version control for a data model in accordance with at least one of the various embodiments.

FIG. 5 illustrates a logical representation of version control for budget 500 in accordance with at least one of the various embodiments. In at least one of the various embodiments, budget models, such as, model 502 may be arranged to include various components, such as, model layer 504, change journal 508, or the like. In at least one of the various embodiments, data model 502 may be a logical representation of a data model such as data model 400 as described in FIG. 4. However, one of ordinary skill in the art will appreciate the data model 502 could represent various types of data model, having various relationships and/or objects.

In at least one of the various embodiments, data model 502 may be arranged to have model layer 504 that includes the logical representation of all the entities, services, objects, items, or the like, that are included in the model. In at least one of the various embodiments, the model layer 504 may include one or more objects 506 that may represent the entities, services, and items, that may be included in the model. In at least one of the various embodiments, if the model represents a budget model, objects 506 may include business centers, business services, business units, servers, laptops, desktops, mobile devices, storage, projects, work tickets (such as for a help desk), cost centers, general ledger transactions, sub-ledger line items, rate cards, or the like. In some cases, a model layer 504 may be comprised of objects 506 that represent the particular items a business intends to manage within a particular financial model. Accordingly, each data model may include a set of objects that may be unique for each business or one or more sub-organizations within a single entities.

In at least one of the various embodiments, objects 506 may be implemented using software modules arranged to model objects in data model 500. One of ordinary skill in the art will appreciate that such objects may be implemented using one or more computer programming languages, computer scripting languages, database stored procedures, or the like. Further, in at least one of the various embodiments, objects 506 may be stored and/or implemented using databases, including, SQL databases, object oriented databases, column-oriented databases, NoSQL databases, custom databases, or the like.

In at least one of the various embodiments, model layer 504 may include allocation rules 508 that may define in part how objects 506 relate to each other within the context of a particular budget project. In at least one of the various embodiments, allocation rules 508 may be used to define how one object, such as Storage Services, may be allocated among other cost objects. Users may arrange one or more allocation rules to match the entities being modeled within the budget. In at least one of the various embodiments, one or more allocation rules may be defined in part based on templates, user-interface dialog boxes, command-line commands, configuration files, policy rules, business rules, or the like. For example, in at least one of the various embodiments, allocation rules 508 may determine how costs for a modeled budget may be propagated between and among at least the objects that make up the budget's data model.

In at least one of the various embodiments, resource values cache 510 may include one or more resource values that may be computed using the objects, allocation rules, assignment ratios, or the like, included in a model layer of a data model. In some embodiments, production systems may include many objects and model items (e.g., thousands of objects, some with millions of model items). Accordingly, for some production models, computing actual allocation/assignment values and/or values for other reports may take significant computing resources. Thus, in some embodiments, values cache 510 may be arranged to store these resource values so they may be reused if possible. In at least one of the various embodiments, resource values may represent various measured and/or computed values types and/or units depending on the data model. For example, resources value could represent, cash/money, energy, labor, commodities, or the like, or combination thereof. For example, data models that model financial systems (e.g., budget model) may often include resource values that represent costs that may be allocated using the model. Resource values in other models for modeling energy flows may represent quantities of energy.

In at least one of the various embodiments, data models may have a corresponding change journal, such as, change journal 512. In at least one of the various embodiments, each design action performed during the lifetime of data model 502 may be recorded and stored in change journal 512. In some embodiments, the change journal may be arranged to re-playable. Accordingly, it may be arranged to include records (change journal records) that may be parsed and replayed to construct to generate a model. Thus, in some embodiments, a data model may be duplicated by replaying its corresponding change journal. See, FIG. 6 and its accompanying description.

In at least one of the various embodiments, an application, such as, cost modeling application 322, may be arranged to instantiate one or more separate logical workspaces for one or more users that would like to propose/try modifying the model without impacting other users of the model. Otherwise, changes made by a user may impact other users including production systems.

Accordingly, in at least one of the various embodiments, user workspaces, such as, user workspace 514 and user workspace 516 may be instantiated for each user that may be interested in editing/working with data model 502. In some embodiments, each user workspace may be considered a scratch model and/or sandbox that enables users to modify their version of a data model without affecting the main data model. In some embodiments, user workspaces may include storage that may be separate from a main data model. Also, in at least one of the various embodiments, user workspaces may be hosted on servers/computers that are separate from the data model they are derived from.

In at least one of the various embodiments, as users makes modifications to the data model using their individual workspace, objects that are changed are locally instantiated in the user's workspace. For example, in some embodiments, if a user working in user workspace 514 edits or modifies objects, such as, object 518, and object 520 may be instantiated and associated with user workspace 514. Likewise, if another user is separately working on model 502, using user workspace 516, changes they may make to objects may be instantiated and associated with their user workspace (user workspace 516), such as, object 522.

In at least one of the various embodiments, cost modeling application 322 may be arranged to enable multiple workspaces that enable multiple users to have their own scratch model/sandbox to work with. However, in some embodiments, individual data model objects may be managed such that a single workspace may be arranged to have exclusive rights to modify a given object. For example, in at least one of the various embodiments, if object 518 is instantiated for modification in the workspace of User 1 (workspace 514), other workspaces may be disabled from editing/modifying object 518. Though, in some embodiments, other user workspaces may be enabled to have read-only access to the data model object (in data model 502) that corresponds to the workspace object 518.

In at least one of the various embodiments, users may make various changes, such as, adding objects, deleting objects, editing objects, editing values, editing allocation rules, adding allocation rules, or the like, or combination thereof. Each change may be restricted to the user workspace that it was performed in. At some point, the user may decide that modifications associated with their user workspace should be merged into the main data model.

Accordingly, in at least one of the various embodiments, the cost modeling application may be arranged to merge the changes that were restricted to the user workspace into the main data model. In at least one of the various embodiments, after the changes associated with a user workspace are merged into the main data model, those changes are available to others—they become part of the main data model.

In at least one of the various embodiments, generating a user workspace version of data model may include replaying the change journal of the model to generate the workspace version of the model. However, the values from values cache may be obtained by referencing the values cache of the main data model. For example, in some embodiments, user workspace 514 may include a model generated by replaying change journal 512, and the data for the workspace data model may be obtained from values cache 510. Accordingly, in some embodiments, the expense of re-computing the values may be avoided.

In at least one of the various embodiments, user workspaces may include workspace change journals, such as, workspace journal 524, and workspace journal 526. Accordingly, in some embodiments, workspace change journal entries may be created that represent changes made by a user to their workspace data model. Accordingly, in at least one of the various embodiments, if a user is ready to apply his or her changes to the main data model, the workspace journal entries may be replayed against the main data model. Likewise, user workspaces may be updated by re-syncing with the most change journal of the data model.

In at least one of the various embodiments, each workspace and/or object in a workspace may be associated with a version number. Also, each resource value may be associated with a version number. Accordingly, in at least one of the various embodiments, model objects may be arranged to depend on particular versions of resource values. Thus, in at least one of the various embodiments, if a modified object is used to compute a value it may be cached locally and associated with the version number that of the workspace and/or objects that it depends on.

In at least one of the various embodiments, since user workspace 516 has not modified object 2 (object 520 in workspace 514), it may use the cached values for object 2 that come from main data model 502. In at least one of the various embodiments, if the user workspace does not include a locally modified object it will use the version of the resources from its parent.

In at least one of the various embodiments, one or more user workspaces, such as, user workspace 514 and/or user workspace 516 may be located on one or more computers that are separate from the one or more computers that be hosting main data model 502. Accordingly, in at least one of the various embodiments, the computers running the user workspaces and the computers running the main data model may be communicatively coupled using one or more networks, such as, wireless network 110, network 111, or the like. Accordingly, in some embodiments, user workspaces may be disconnected from the main data model when the network communication may be interrupted. In some embodiments, network interruptions may be caused by excessive network traffic crowding out the communication between user workspace computers and computers hosting the main data models. Further, in some embodiments, various unexpected communication outages may occur. Accordingly, in at least one of the various embodiments, a cost modeling application may be arranged to provide status/heartbeat communication between separately hosted user workspaces and main data models. In some embodiments, if a cost modeling application and/or its host computer goes offline (e.g., loses network connectivity with the computer hosting the main data model) the cost modeling application may be arranged to notify the user that their user workspace is no longer actively associated with its main data model. Also, in at least one of the various embodiments, since the user workspace data model may depend on resource values stored with the main data model actions executing on the separated user workspace may be paused automatically.

Further, in at least one of the various embodiments, when separated user workspaces reestablish access to their main data model, a cost modeling application may be arranged to scan the resource value on the main data model to confirm that resource values are available.

In at least one of the various embodiments, a cost modeling application may be arranged to locally store some or all of the resource values used by a remote user workspace. In some embodiments, some or all of the resource values may be copied to a computer local to the computers hosting a user workspace. Accordingly, in some embodiments, if network communication between a user workspace and its main data model is lost, the locally stored resource values may be used.

FIG. 6 illustrates a partial view change journal 600 for at least one of the various embodiments. In at least one of the various embodiments, if a modification may be made to a budget project version, a record of the modification may be stored in change journal 600. In at least one of the various embodiments, a change journal may include enough information in each record to determine what modification occurred, the time when it occurred (e.g., timestamp), and who and/or what caused the modification. In at least one of the various embodiments, an auditing log may include enough information in each record to enable recorded modifications to be replayed and/or recreated. Also, in at least one of the various embodiments, multiple change journal records may be replayed to create "duplicate" data model versions. In at least one of the various embodiments, a data model may be a duplicate of another data model if it was created by replaying the change journal records generated from the other data model. In at least one of the various embodiments, a change journal 600 may store information, such as, row identifier 602 Timestamp 604, User 606, Status 608, and Description 610, or the like. One of ordinary skill in the art will appreciate that change journals may be arranged in other ways. In at least one of the various embodiments, change journals may have more or fewer values per row than as shown in FIG. 6. An arrangement may be sufficient if the change journal includes enough information to enable replaying or recreating the modifications made to a data model.

Further, in at least one of the various embodiments, a change journal may reference other files, tables, databases, or the like, rather than storing all of the data and information required to recreate the recorded modification directly within change journal 600. For example, in at least one of the various embodiments, if recorded modifications may require significant data uploads, change journal 600 may reference another source for the uploaded data (e.g., a file system, database, or the like) to avoid storing excessive duplicate data within the change journal itself.

In at least one of the various embodiments, change journal 600 may record information in addition to project version modifications history. In at least one of the various embodiments, a change journal may record additional information such as a tag. A non-limiting example of special record MakeTag 618 is shown as occurring at Timestamp 10/12/2011 14:14:05 in row 616. In at least one of the various embodiments, a make tag change journal record may indicate that a tag has been created and recorded in change journal 600. In at least one of the various embodiments, a tag may enable a taking a snapshot of the change journal as it exists when the tag was created. In at least one of the various embodiments, if a tag is used to save the state of the change journal, subsequent changes in the change journal may occur without altering the tag's view of change journal records saved and/or referenced by the tag. In at least one of the various embodiments, change journal records associated with a tag may be preserved and may be recalled by referencing the associated tag even though the original change journal may have been modified. In the embodiment shown in FIG. 6, tag 618 named 'Build 10' is depicted in a change journal at row 616. One of ordinary skill in the art will appreciate that the fields, formats, and descriptions of a tag as used in FIG. 6 are merely one of many variants that may be employed to implement a tag. Further, one of ordinary skill the art will appreciate that a tag record may be in the change journal, or it may be located elsewhere within the system with a reference the change journal. In at least one of the various embodiments, the state of an change journal associated with a tag may be preserved by recording one or more copies of the change journal records associated with the tag in a separate location, preserving differences between the change journal records associated with a tag and subsequent changes made to the change journal, or the like.

Figure 7:
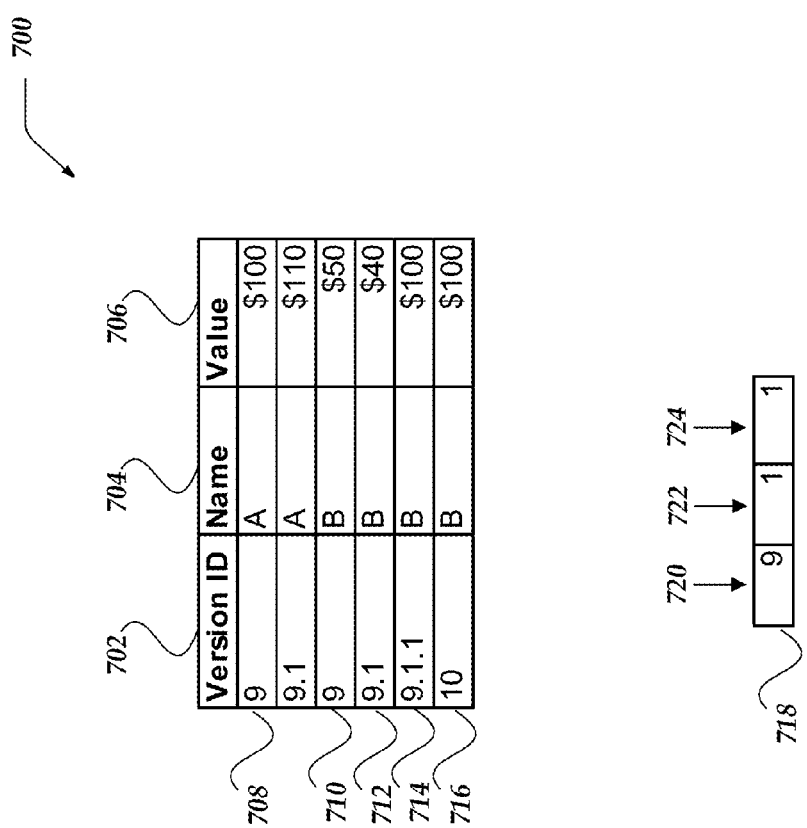
FIG. 7 illustrates a logical representation of a version table for tracking resource versions and there values in accordance with at least one of the various embodiments.

FIG. 7 illustrates a logical representation of version table 700 for tracking resource versions and there values in accordance with at least one of the various embodiments. As described above, resource values, including computed resource values may be associated with a version identifier that may be used to associate the appropriate version of a resource value with a particular object and/or data model.

In at least one of the various embodiments, version tables, such as, version table 700 may be arranged to include various columns, including, version ID 702, name 704, value 706, or the like. In at least one of the various embodiments, the version identifier may be arranged to represent whether the version is associated with a user workspace, an edit object in a particular workspace, or the main data model.

In at least one of the various embodiments, version IDs may be arranged such as version ID 718. In this example, the first portion of the ID, portion 720 represents the main data model version (or build number) the resource is associated with. Portion 722 represents a version associated with a workspace, and, in at least one of the various embodiments, portion 724 represents a version associated to a particular object in a workspace.

For example, record 708 includes a version ID of 9 which represents a version of resource A that is associated with version 9 of the main data model and record 710 represents a version of resource B that is also associated with version 9 of the main data model.

In this example, for some embodiments, record 716 has a version of 10. This indicates that this resource value is associated with version 10 (e.g., build 10) of the main model. In this example, record 710 and record 716 may be both stored even though they are different versions for same resources for the same main data model. This enables user workspaces that rely on the version 9 values of resource B to use the version of the resources that they started with. For example, in some embodiments, a user workspace may be open and active for several days. Accordingly, to avoid disruption the cost modeling application is arranged to maintain the resource version for each open/active user workspace.

In this example, for example, record 710 shows a resource version record that has a version ID of "9". Also, record 712 shows a resource version record that has a version ID of 9.1. Each record (record 710 and record 712) represent different versions of the same resource. The version 9 of the resource is the version that is associated with the main data model, and version 9.1 is a version of the resource that is associated with a user workspace spawned from the main data model. Likewise, record 714, has a three level version number that represents a version of the B resource for a particular object in a user workspace that is spawned from the main data model.

In at least one of the various embodiments, the cost modeling application may be arranged to perform actions to free/release unused version of resources and remove from the caches. Accordingly, the application may scan the main data model and outstanding workspaces to determine if there are workspaces and/or workspace objects that may be reference each version of a resource. Unreferenced versions of resources may be deleted or otherwise removed from the caches.

Generalized Operations

FIGS. 8-11 represent the generalized operations of version control for resource allocation modeling in accordance with at least one of the various embodiments. In at least one of the various embodiments, processes 800, 900, 1000, and 1100 described in conjunction with FIGS. 8-11 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 8-11 may be operative in cost modeling and version control architectures such as those described in conjunction with FIGS. 4-7.

Figure 8:
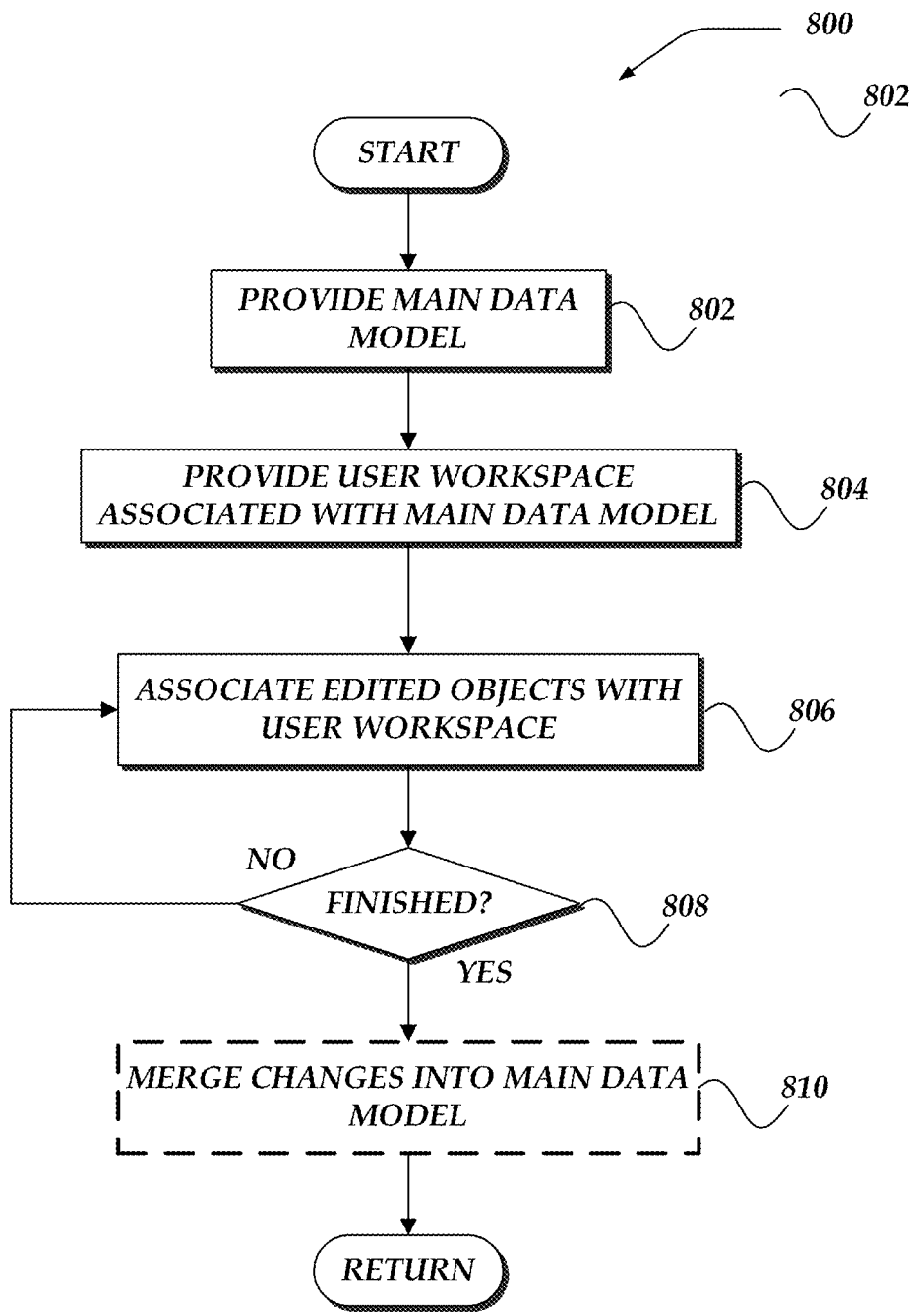
FIG. 8 illustrates a flowchart for a process for version control for resource allocation modeling in accordance with at least one of the various embodiments.

FIG. 8 illustrates a flowchart for process 800 for version control for resource allocation modeling in accordance with at least one of the various embodiments. After a start block, at block 802, in at least one of the various embodiments, a main data model may be provided. In some embodiments, one or more separate main data models may exist in a system. A particular main data model may be selected by a user. In some embodiments, a main data model may be automatically selected based on the identity of the user and/or the user's role, access level, authorization, or the like, or combination thereof. In at least one of the various embodiments, an application, such as, cost modeling application 322, cost modeling client application 222, may be arranged to provide a user-interface that enables users to select a main data model.

At block 804, in at least one of the various embodiments, a user workspace that is associated with the provided main data model may be provided. In at least one of the various embodiments, an application, such as, cost modeling application 322 may be arranged to allocated memory, computing resources, or the like, for the user workspace. In at least one of the various embodiments, a user workspace data model may be generated by replaying one or more change journal records that are associated with the main data model.

In at least one of the various embodiments, an application, such as, cost modeling application 322, cost modeling client application 222, may be arranged may be arranged to provide a user-interface that enables a user to activate an edit-mode, or the like, which instantiates one or more user workspaces.

At block 806, in at least one of the various embodiments, as edits are performed, one or more workspace objects may be instantiated and associated with the user workspace. In at least one of the various embodiments, objects that are edited by the user may be locally instantiated in the sense that the user is enabled to make edits without affecting the objects in the main data model.

In at least one of the various embodiments, changes made to edited objects may be accessible/visible to user workspace they are associated with. The edited objects may be invisible and/or unavailable to the main data model as well as other user workspaces. Accordingly, in at least one of the various embodiments, the main data model as well as other workspaces may be unaffected by changes to objects made within a user workspace.

At decision block 808, in at least one of the various embodiments, if the user is finished editing the user workspace model, control may flow to block 810; otherwise, control may loop back to block 806.

At block 810, in at least one of the various embodiments, optionally, some or all of the changes made to the user workspace model may be merged into the main model. Merging the changes may include replaying the change journal records corresponding to the changes made in the user workspace in the main data model. In some cases, merged changes may trigger one or more resource values to be re-computed. Also, in at least one of the various embodiments, if changes are merged into the main data model, the version ID of the main data model may be updated. Next, control may be returned to a calling process.

In at least one of the various embodiments, this block may be considered optional because there is no requirement to merge changes made in a workspace data model into their main data model—they may be discarded. Or, in at least one of the various embodiments, the user workspace model may be left available, separate from the main data model.

Figure 9:
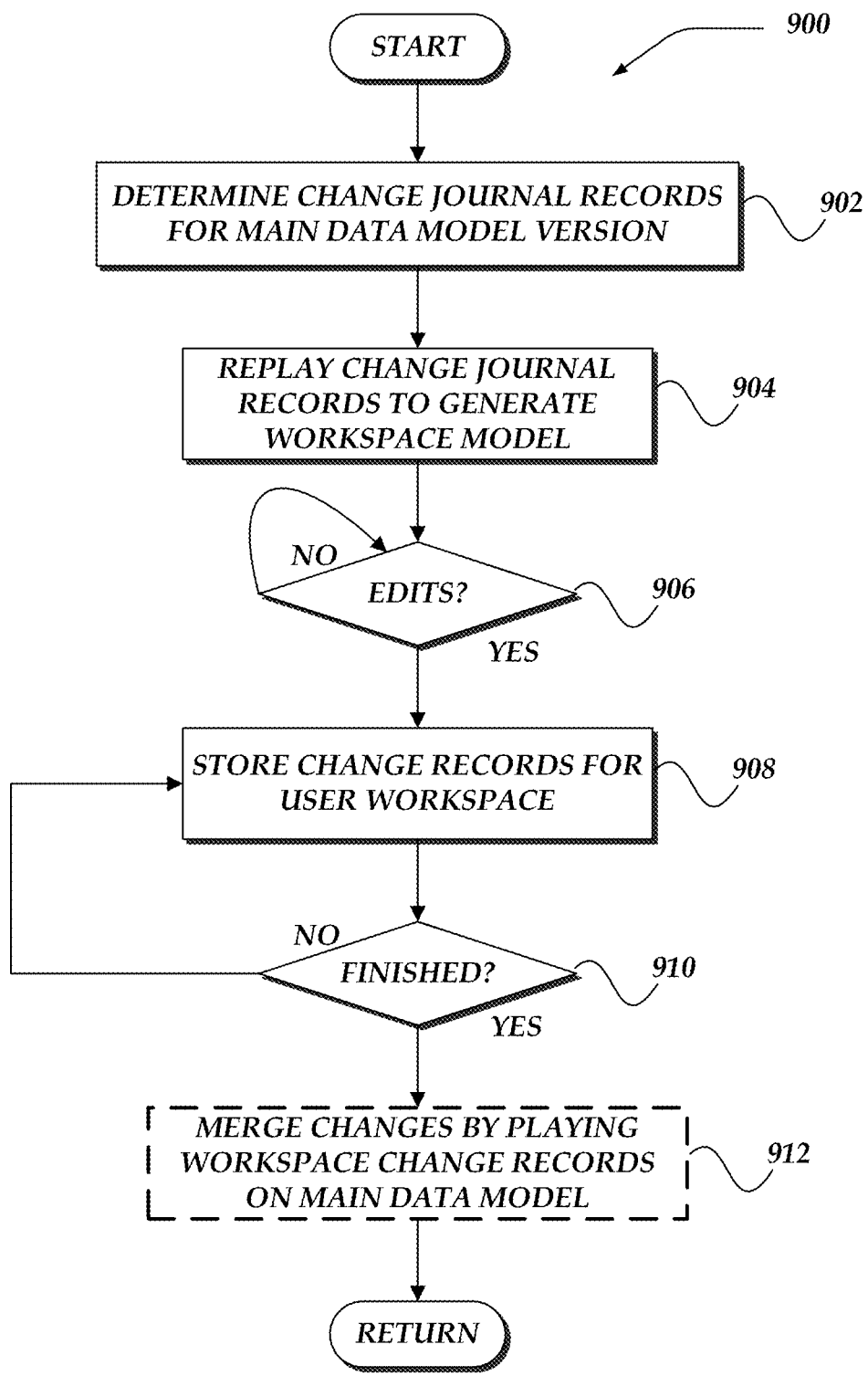
FIG. 9 illustrates a flowchart for a process for version control for resource allocation modeling in accordance with at least one of the various embodiments.

FIG. 9 illustrates a flowchart for process 800 for version control for resource allocation modeling in accordance with at least one of the various embodiments. After a start block, at block 902, in at least one of the various embodiments, the change records for the main data model may be determined. In at least one of the various embodiments, a user may request change records associated with a version of the main data model. In some embodiments, the user may be provided the change records associated with the latest (most recent) version of the main data model. In at least one of the various embodiments, references to the change journal records may be provided rather than the actual records.

In at least one of the various embodiments, the version of the main data model that is selected may be associated with a tag value that may be stored in the main data model's change journal. The tag indicates that change records stored prior to the tag may be part of the selected version. Change records that are stored after the version tag (at a later time) may be considered separate from the selected version.

At block 904, in at least one of the various embodiments, the provided change records may be replayed to generate a workspace data model within (or associated with) the user's user workspace. In at least one of the various embodiments, the change records associated with the main data model may be replayed to generate the user workspace model.

In at least one of the various embodiments, the change record may be added to the workspace change journal to record/indicate which main data model version was used to generate the workspace data model. Accordingly, the other change journal records may remain part of the main data model rather than being duplicated in the workspace change journal. For example, if version 10 of the main data model is used, a change journal tag of 'Build 10' may be added to the user workspace change journal. The remainder of the change journal records in the main data model change journal may remain in place.

Also, in at least one of the various embodiments, the resource values that may be cached for the main data model may remain in place rather than being duplicated for the user workspace. References to resources included in the user workspace data model will point to values used by the main data model. As described above, the resources may be referenced by name (ID) and version ID. Accordingly, the user workspace data model may reference the previously cache resource values using the appropriate name and version ID.

At decision block 906, in at least one of the various embodiments, if the user makes edits or otherwise modifies the workspace data model, control may flow to block 908; otherwise, control may loop back to decision block 906.

In at least one of the various embodiments, users may create user workspaces and user workspace models to provide a stable version of the main data model. This may enable a user to view a stable of the data model even if other users change the main data model. Accordingly, in at least one of the various embodiments, there is no requirement to actually perform edits on a user workspace model after a user workspace is created.

In at least one of the various embodiments, resource value versions that are associated with a user workspace model may be retained. Accordingly, in at least one of the various embodiments, if resource values are re-computed for the main data model, the user workspace data model may continue to use the resource value versions that were in place when the user workspace model was created.

At block 908, in at least one of the various embodiments, the change records associated with the edit/modification being made to the workspace data model may be stored and associated with the workspace. As described above, each workspace may be arranged to maintain its own unique and separate change journal. This workspace change journal may be arranged to record change journal records for each modification.

In at least one of the various embodiments, the workspace change journal may be arranged to include just the changes made since the workspace model was provided. Change journal records of the main data model may remain associated with the main data model. The change journal records do not need to be duplicated in the user workspace change journal. The change journal records of the main data model may be re-played without importing them into the user workspace.

At decision block 910, in at least one of the various embodiments, if the user is finished editing/modifying the user workspace model, control may flow to block 912; otherwise, control may loop back to block 908. In at least one of the various embodiments, a user may interactively edit the user workspace mode. After one or more edits the user may review the impact of the changes by using the user workspace model. Accordingly, changes that 'break' the user workspace data model may be restricted to a user's user workspace rather than affecting other user workspaces and/or the main data model.

At block 912, in at least one of the various embodiments, optionally, the changes may be merged into the main data model by replaying the user workspace change journal onto the main data model.

In at least one of the various embodiments, this block may be considered optional because there is no requirement to merge changes made in a workspace data model into their main data model—they may be discarded. Or, in at least one of the various embodiments, the user workspace model may remain, separate from the main data model. Next, control may be returned to a calling process.

Figure 10:
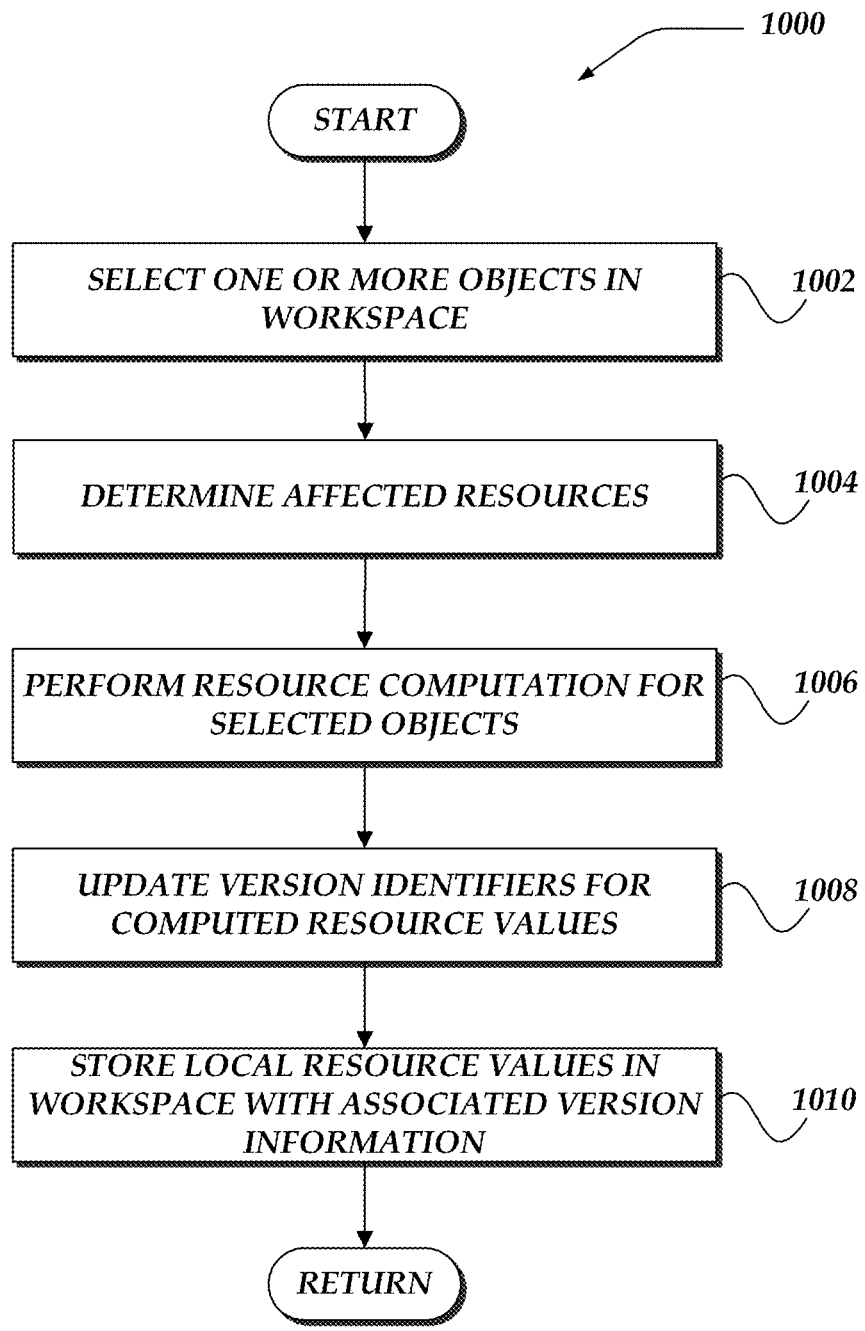
FIG. 10 illustrates a flowchart for a process for updating resource values based on edit made in a workspace in accordance with at least one of the various embodiments.

FIG. 10 illustrates a flowchart for process 1000 for updating resource values based on edit made in a workspace in accordance with at least one of the various embodiments. In at least one of the various embodiments, if a user has made modifications to their user workspace data model, they may want to re-compute one or more resource values that may be affected by the modifications. In at least one of the various embodiments, this may enable the user to preview the impact his or her proposed edits may have before the new changes are merged back into the main data model.

After a start block, at block 1002, in at least one of the various embodiments, one or more objects in a user workspace may be selected. In at least one of the various embodiments, a user may select some or all of the objects in their workspace to re-compute resource values that may be associated with those objects. For example, if changes are made to Object 1 that impact Object 2 that user may select Object 1 for re-computing. In some embodiments, the cost modeling application may trace the data model to identify objects that may have dependencies. Accordingly, in at least one of the various embodiments, the cost modeling application may indicate (e.g., provide a list) which objects may be impacted by changes being made in the workspace.

At block 1004, in at least one of the various embodiments, the resources associated with the selected one or more objects may be determined. In at least one of the various embodiments, a cost modeling application may be arranged to traverse the data model to identify the resources that are associated with the selected objects. As described above, since resources are allocated through the data model using allocation rules, the model may be traced to identify the resources (and their particular version IDs) that may be associated with the selected objects. For example, referring to data model 400 in FIG. 4, modifications to allocation rule 412 will impact at least resources associated with servers object 406 and application object 408. Likewise, for example, there may be one or more reports that display various resource values. Accordingly, changes that impact reports may also be associated with resources that are computed for display in one or more reports.

At block 1006, in at least one of the various embodiments, the values for selected resources may be computed. In at least one of the various embodiments, the resource values may be computed based on the user workspace data model. Also, in at least one of the various embodiments, portions of the computation may be based on the main data model and/or portions of the computations may be based on the user workspace.

At block 1008, in at least one of the various embodiments, version identifiers for computed resources value may be updated. In at least one of the various embodiments, resource values that are changed and/or have new value after re-computation may have their version IDs updated. In at least one of the various embodiments, resource values that may be unchanged may maintain their current (old) version ID. For example, if a resource value has a version ID of '9.1.1' it may be updated to '9.1.2' if its value changed during the re-compute.

At block 1010, in at least one of the various embodiments, the resource values may be stored locally and/or otherwise associated with the user workspace. In at least one of the various embodiments, resource values that may be impacted or otherwise have changes may be stored in a data store for use by the user workspace that initiated the re-computation. Accordingly, in some embodiments, other (previously computed) versions of those resource values may remain available for use by other user workspaces and/or the main data model. Next, control may be returned to a calling process.

Figure 11:
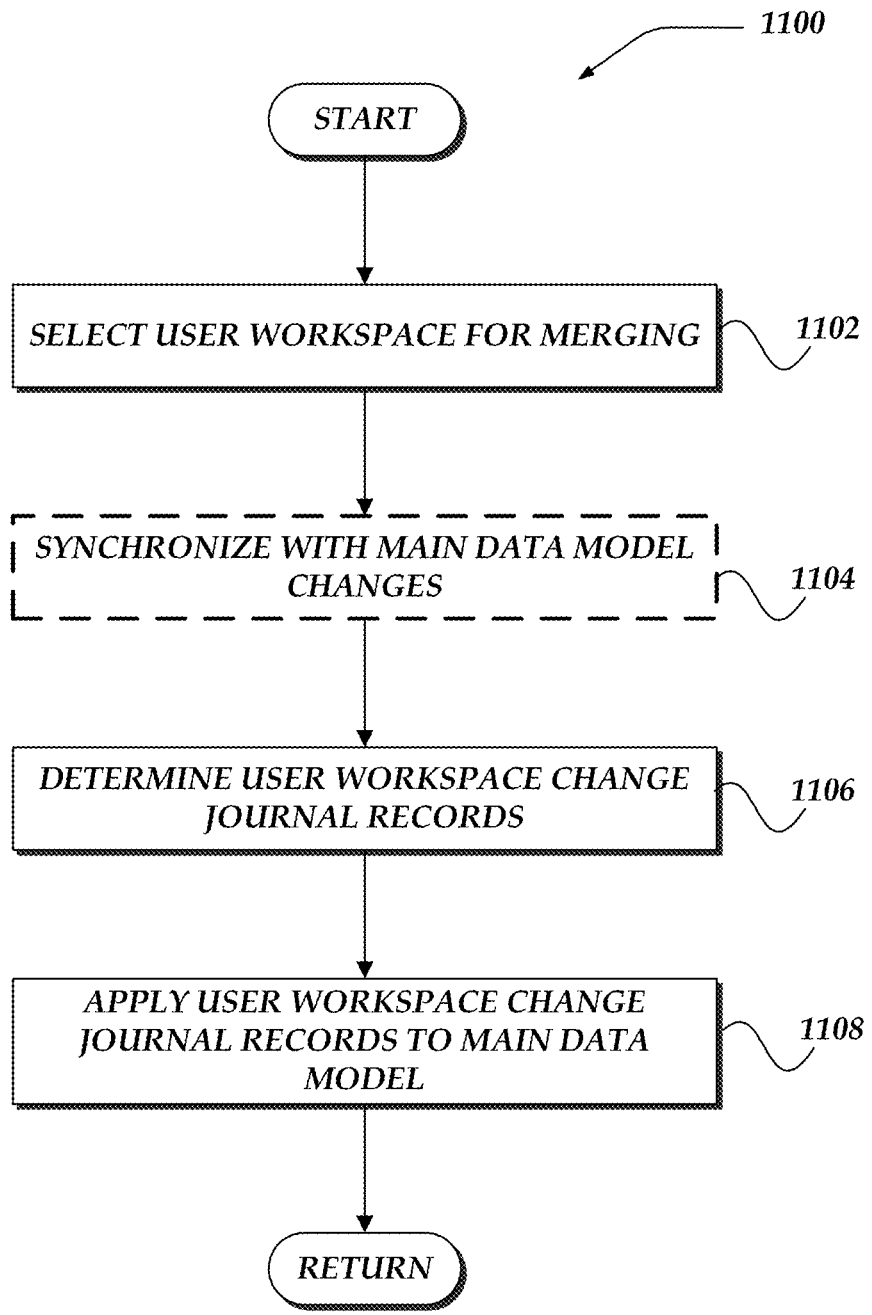
FIG. 11 illustrates a flowchart for a process for merging changes made in a user workspace into a main data model in accordance with at least one of the various embodiments.

FIG. 11 illustrates a flowchart for process 1100 for merging changes made in a user workspace into a main data model in accordance with at least one of the various embodiments. After a start block, at block 1102, in at least one of the various embodiments, a user workspace may be selected for merging into the main data model. In at least one of the various embodiments, the selected user workspace may be a user workspace that was generated from the main data model that is being merged into.

At block 1104, in at least one of the various embodiments, optionally, the user workspace may be synchronized with the main data model. Accordingly, if changes have been made to the main data model since the user workspace was created, they may be merged into the user workspace.

In at least one of the various embodiments, the cost modeling application may be arranged to determine each change journal record associated with the main data model that is not included in the user workspace model. In at least one of the various embodiments, the cost modeling application may be arranged to determine if there are change journal records in the main data model change journal that are associated with a later build version of than the one used to generate the user workspace model. For example, if the user workspace used version 9 of the main data model, there will be a tag in the change journal of the main data model marking where journal records associated with version 9 end and the next version begins. Accordingly, as described above, change journal records up to the version 9 tag represent the actions that were replayed to generate the user workspace model. Thus, in this example, if there are change journal records that come after the version 9 tag, the changes associated those later (newer) records have not been applied to the user workspace model.

In at least one of the various embodiments, merging change journal records from an unsynchronized user workspace may not be compatible with the later changes. Accordingly, in some embodiments, merging an unsynchronized user workspace with a main data model may cause unexpected impacts. For example, changes subsequently made to the main data model may have deleted objects that the user workspace model version depends on. Thus, in some case, the changes associated with the user workspace model may break the main data model if they are applied.

Accordingly, in at least one of the various embodiments, synchronizing the user workspace with the main data model applies any changes made to the main data model to the user workspace model. In at least one of the various embodiments, the synchronized changes may break the user workspace model and/or cause unwanted/unexpected impacts. However, the user may modify the user workspace model to make corrections to account for the changes to the main data model.

In at least one of the various embodiments, the cost modeling application may be arranged such that it requires a user workspace to be synchronized with its main data model before merging. Accordingly, in some embodiments, if the main data model's change journal includes records that were not used to generate the user workspace, those change journal records may be applied to the user workspace. For example, in some embodiments, if version 9 of the main data model was used to create a user workspace, and the current version of the main data model is version 10, the changes to the main data model that occurred between version 9 and version 10 may be applied to the workspace before it is allowed to be merged.

In at least one of the various embodiments, this block may be considered optional because some embodiments may not synchronize changes from the main data model into a workspace data model before merging the user workspace with the main data model.

At block 1106, in at least one of the various embodiments, the relevant user change journal records may be provided. In at least one of the various embodiments, each user workspace maintains its own change journal. As described above, this change journal captures the modifications that are made in the user workspace. In at least one of the various embodiments, this may include, table/object edits, adding new tables/objects, deleting tables/objects, adds/edits/deletes of reports, or the like, or combination thereof.

At block 1108, in at least one of the various embodiments, the relevant change journal records from the user workspace may be replayed against the main data model. Replaying the user workspace change journal records creates modification in the main data model that match the modifications made to the user workspace data model. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing data models using a network computer that employs one or more processors to execute instructions that perform actions, comprising:

provided a main data model that at least includes a change journal having a plurality of change records that store data modifications, one or more resource values, and one or more model objects, wherein the change records include an identifier (ID), a timestamp, a status, and a description;

providing one or more user workspaces that are associated with the main data model, wherein the one or more user workspaces provide a workspace data model based on the main data model and one or more of the plurality of change records;

providing one or more model objects that are both included with the one or more user workspaces and modified by a user, wherein each modification by the user to the one or more modified model objects is employed to provide one or more workspace change records; and when the user selects merging of the one or more user workspaces with the main data model, employing the one or more workspace change records to execute the merge of the one or more modified model objects with the main data model.

2. The method of claim 1, further comprising, providing the workspace data model by executing the portion of the plurality of change records to perform actions in the user workspace.

3. The method of claim 1, further comprising, referencing the one or more resource values from the workspace data model, wherein the workspace data model references a version of the one or more resource values based on when the user workspace is provided.

4. The method of claim 1, further comprising:
providing one or more workspace resource values based on the one or more modified model objects; and
storing the one or more workspace resource values separately from the main data model.

5. The method of claim 1, further comprising:
providing one or more change records from the main data model, wherein the one or more change records are newer than the one or more of the plurality of change records for the workspace data model; and
modifying the workspace data model based on the one or more change records for the main data model.

6. The method of claim 1, wherein merging the main data model, further comprises:
modifying the one or more model objects in the merged main data model; and
including one or more new change records with the merged data model, wherein the one or more new change records correspond to the one or more workspace change records.

7. The method of claim 1, further comprising:
caching at least a portion of the one or more resource values in the user workspace when network communication is unavailable; and
providing the cached at least portion of the one or more resource values when network communication is available.

8. The method of claim 1, wherein the main data model further includes, one or more allocation rules that allocate one or more resources within the main data model.

9. A system for managing data models, comprising:
a network computer, comprising:
a transceiver that communicates over the network;
a memory that stores at least instructions; and
a processor device that executes instructions that perform actions, including:
providing a main data model that at least includes a change journal having a plurality of change records that store data modifications, one or more resource values, and one or more model objects, wherein the change records include an identifier (ID), a timestamp, a status, and a description;
providing one or more user workspaces that are associated with the main data model, wherein the one or more user workspaces provide a workspace data model based on the main data model and one or more of the plurality of change records;
providing one or more model objects that are both included with the one or more user workspaces and modified by a user, wherein each modification by the user to the one or more modified model objects is employed to provide one or more workspace change records; and when the user selects merging of the one or more user workspaces with the main data model, employing the one or more workspace change records to execute the merge of the one or more modified model objects with the main data model; and a client computer, comprising:
a transceiver that communicates over the network;
a memory that stores at least instructions; and
a processor device that executes instructions that perform actions, including:
providing the user-interface to a user; and
providing one or more user interactions to the network computer.

10. The system of claim 9, wherein the network computer processor device executes instructions that perform actions, further comprising, providing the workspace data model by executing the portion of the plurality of change records to perform actions in the user workspace.

11. The system of claim 9, wherein the network computer processor device executes instructions that perform actions, further comprising, referencing the one or more resource values from the workspace data model, wherein the workspace data model references a version of the one or more resource values based on when the user workspace is provided.

12. The system of claim 9, wherein the network computer processor device executes instructions that perform actions, further comprising:
providing one or more workspace resource values based on the one or more modified model objects; and
storing the one or more workspace resource values separately from the main data model.

13. The system of claim 9, wherein the network computer processor device executes instructions that perform actions, further comprising:
providing one or more change records from the main data model, wherein the one or more change records are newer than the one or more of the plurality of change records for the workspace data model; and
modifying the workspace data model based on the one or more change records for the main data model.

14. The system of claim 9, wherein merging the main data model, further comprises:
modifying the one or more model objects in the merged main data model; and
including one or more new change records with the merged data model, wherein the one or more new change records correspond to the one or more workspace change records.

15. The system of claim 9, further comprising:
caching at least a portion of the one or more resource values in the user workspace when network communication is unavailable; and
providing the cached at least portion of the one or more resource values when network communication is available.

16. The system of claim 9, wherein the main data model further includes, one or more allocation rules that allocate one or more resources within the main data model.

17. A processor readable non-transitory storage media that includes instructions for managing data models, wherein execution of the instructions by a hardware processor performs actions, comprising:

providing a main data model that at least includes a change journal having a plurality of change records that store data modifications, one or more resource values, and one or more model objects, wherein the change records include an identifier (ID), a timestamp, a status, and a description;

providing one or more user workspaces that are associated with the main data model, wherein the one or more user workspaces provide a workspace data model based on the main data model and one or more of the plurality of change records;

providing one or more model objects that are both included with the one or more user workspaces and modified by a user, wherein each modification by the user to the one or more modified model objects is employed to provide one or more workspace change records; and when the user selects merging of the one or more user workspaces with the main data model, employing the one or more workspace change records to execute the merge of the one or more modified model objects with the main data model.

18. The media of claim 17, further comprising, providing the workspace data model by executing the portion of the plurality of change records to perform actions in the user workspace.

19. The media of claim 17, further comprising, referencing the one or more resource values from the workspace data model, wherein the workspace data model references a version of the one or more resource values based on when the user workspace is provided.

20. The media of claim 17, further comprising:
providing one or more workspace resource values based on the one or more modified model objects; and
storing the one or more workspace resource values separately from the main data model.

21. The media of claim 17, further comprising:
providing one or more change records from the main data model, wherein the one or more change records are newer than the one or more of the plurality of change records for the workspace data model; and
modifying the workspace data model based on the one or more change records for the main data model.

22. The media of claim 17, wherein merging the main data model, further comprises:
modifying the one or more model objects in the merged main data model; and
including one or more new change records with the merged data model, wherein the one or more new change records correspond to the one or more workspace change records.

23. The media of claim 17, further comprising:
caching at least a portion of the one or more resource values in the user workspace when network communication is unavailable; and
providing the cached at least portion of the one or more resource values when network communication is available.

24. A network computer for managing data models, comprising:
a transceiver that communicates over the network;
a memory that stores at least instructions; and
a processor device that executes instructions that perform actions, including:
providing a main data model that at least includes a change journal having a plurality of change records that store data modifications, one or more resource values, and one or more model objects, wherein the change records include an identifier (ID), a timestamp, a status, and a description;
providing one or more user workspaces that are associated with the main data model, wherein the one or more user workspaces provide a workspace data model based on the main data model and one or more of the plurality of change records;
providing one or more model objects that are both included with the one or more user workspaces and modified by a user, wherein each modification by the user to the one or more modified model objects is employed to provide one or more workspace change records; and
when the user selects merging of the one or more user workspaces with the main data model, employing the one or more workspace change records to execute the merge of the one or more modified model objects with the main data model.

25. The network computer of claim 24, further comprising, providing the workspace data model by executing the portion of the plurality of change records to perform actions in the user workspace.

26. The network computer of claim 24, further comprising, referencing the one or more resource values from the workspace data model, wherein the workspace data model references a version of the one or more resource values based on when the user workspace is provided.

27. The network computer of claim 24, further comprising:
providing one or more workspace resource values based on the one or more modified model objects; and
storing the one or more workspace resource values separately from the main data model.

28. The network computer of claim 24, further comprising:
providing one or more change records from the main data model, wherein the one or more change records are newer than the one or more of the plurality of change records for the workspace data model; and
modifying the workspace data model based on the one or more change records for the main data model.

29. The network computer of claim 24, wherein merging the main data model, further comprises:
modifying the one or more model objects in the merged main data model; and
including one or more new change records with the merged data model, wherein the one or more new change records correspond to the one or more workspace change records.

30. The network computer of claim 24, further comprising:
caching at least a portion of the one or more resource values in the user workspace when network communication is unavailable; and
providing the cached at least portion of the one or more resource values when network communication is available.

* * * * *